(12) United States Patent
Askey et al.

(10) Patent No.: US 11,654,561 B2
(45) Date of Patent: May 23, 2023

(54) AUTOMATED CONSTRUCTION ROBOT SYSTEMS AND METHODS

(71) Applicant: Ascend Robotics LLC, Cambridge, MA (US)

(72) Inventors: David Askey, Salem, MA (US); Shumei Yin, Salem, MA (US); Daniel Posfai, Rockport, MA (US)

(73) Assignee: Ascend Robotics LLC, Cambridge, MA (US)

( * ) Notice: Subject to any disclaimer, the term of this patent is extended or adjusted under 35 U.S.C. 154(b) by 287 days.

(21) Appl. No.: 16/552,070

(22) Filed: Aug. 27, 2019

(65) Prior Publication Data
US 2020/0061827 A1  Feb. 27, 2020

Related U.S. Application Data

(60) Provisional application No. 62/851,336, filed on May 22, 2019, provisional application No. 62/723,137, filed on Aug. 27, 2018.

(51) Int. Cl.
*B25J 9/16* (2006.01)
*B25J 11/00* (2006.01)
(Continued)

(52) U.S. Cl.
CPC ............. *B25J 9/1669* (2013.01); *B25J 9/162* (2013.01); *B25J 9/1612* (2013.01); *B25J 9/1682* (2013.01);
(Continued)

(58) Field of Classification Search
CPC .... B25J 11/0075; B25J 9/1669; B25J 9/1612; B25J 9/162; B25J 9/1682; B25J 9/1697;
(Continued)

(56) References Cited

U.S. PATENT DOCUMENTS

| 1,012,359 A | 12/1911 | Iversen |
| 5,134,961 A | 8/1992 | Giles et al. |

(Continued)

FOREIGN PATENT DOCUMENTS

| CN | 108160375 A | * 6/2018 |
| CN | 108678739 A | * 10/2018 |

(Continued)

OTHER PUBLICATIONS

International Search Report and Written Opinion of the International Searching Authority in counterpart International PCT Application No. PCT/US2019/048312 dated Nov. 20, 2019.

(Continued)

*Primary Examiner* — B M M Hannan
(74) *Attorney, Agent, or Firm* — Brian J. Colandreo; Jeffery T. Placker; Holland & Knight LLP

(57) ABSTRACT

An automated construction robot system includes: a mobile base assembly configured to be displaceable within the work area; a head assembly configured to process a work surface; an arm assembly configured to moveably-couple the head assembly and the mobile base assembly and controllably-displace the head assembly with respect to the work surface; a machine vision system configured to scan a target area and generate target area information; and a computational system configured to: process the target area information to identify a surface defect, generate one or more remedial instructions based, at least in part, upon the surface defect identified, and manipulate one or more of the mobile base assembly, the head assembly and the arm assembly based, at least in part, upon the one or more remedial instructions.

21 Claims, 13 Drawing Sheets

(51) Int. Cl.
*B25J 18/02* (2006.01)
*G05B 19/4155* (2006.01)

(52) U.S. Cl.
CPC ......... *B25J 9/1697* (2013.01); *B25J 11/0075* (2013.01); *B25J 18/02* (2013.01); *G05B 19/4155* (2013.01); *B25J 9/1661* (2013.01); *G05B 2219/40298* (2013.01); *G05B 2219/45013* (2013.01); *G05B 2219/50391* (2013.01)

(58) Field of Classification Search
CPC ... B25J 18/02; B25J 9/1661; B25J 5/00; B25J 9/0084; B25J 9/1684; B25J 19/023; E04F 21/165; G05B 19/4155; G05B 2219/40298; G05B 2219/45013; G05B 2219/50391; G05B 2219/45065; G05B 2219/45086; B05B 13/0431; E04G 23/02
USPC .......................................................... 700/245
See application file for complete search history.

(56) References Cited

U.S. PATENT DOCUMENTS

| | | | |
|---|---|---|---|
| 5,358,568 A | 10/1994 | Okano et al. | |
| 8,941,817 B2 | 1/2015 | Laudrain | |
| 9,995,047 B2 * | 6/2018 | Raman | G05D 1/0214 |
| 11,230,008 B2 * | 1/2022 | Schweigler | B25J 11/0075 |
| 2010/0143089 A1 | 6/2010 | Hvass et al. | |
| 2010/0152896 A1 | 6/2010 | Komatsu | |
| 2011/0212254 A1 | 9/2011 | Morton | |
| 2013/0279180 A1 * | 10/2013 | Pearson | F21V 21/104 |
| | | | 362/373 |
| 2015/0112482 A1 * | 4/2015 | Kuwahara | G06N 20/00 |
| | | | 901/50 |
| 2015/0148949 A1 | 5/2015 | Chin et al. | |
| 2015/0148955 A1 * | 5/2015 | Chin | B25J 9/1674 |
| | | | 901/41 |
| 2016/0121486 A1 * | 5/2016 | Lipinski | B05B 13/0405 |
| | | | 427/427.3 |
| 2016/0346800 A1 | 12/2016 | McMichael et al. | |
| 2017/0007336 A1 | 1/2017 | Tsuboi et al. | |
| 2017/0080438 A1 | 3/2017 | Storr | |
| 2017/0083005 A1 | 3/2017 | Hickman et al. | |
| 2017/0282202 A1 | 10/2017 | Lim | |
| 2017/0356730 A1 * | 12/2017 | Wang | E21C 37/12 |
| 2018/0009000 A1 * | 1/2018 | Shang | H04N 13/204 |
| 2018/0056670 A1 * | 3/2018 | Kerr | B25J 11/0075 |
| 2018/0093289 A1 | 4/2018 | Raman et al. | |
| 2018/0223546 A1 * | 8/2018 | Wasserfaller, Sr. | E04F 21/12 |
| 2018/0281012 A1 * | 10/2018 | Telleria | B25J 9/1661 |
| 2018/0281143 A1 * | 10/2018 | Albert | E04F 21/165 |
| 2018/0283015 A1 * | 10/2018 | Telleria | B25J 11/0055 |
| 2018/0283017 A1 * | 10/2018 | Telleria | E04F 21/1652 |
| 2018/0283019 A1 * | 10/2018 | Telleria | B05B 9/007 |
| 2018/0326507 A1 * | 11/2018 | Halvorsen | B25H 1/0035 |
| 2019/0030724 A1 * | 1/2019 | Fujikawa | G01L 5/009 |
| 2019/0118209 A1 * | 4/2019 | Rennuit | B25J 13/06 |
| 2019/0255551 A1 | 8/2019 | Hargadon | |
| 2019/0381670 A1 | 12/2019 | Correll | |
| 2020/0269439 A1 * | 8/2020 | Telleria | B25J 9/1697 |
| 2021/0213613 A1 * | 7/2021 | Tani | B25J 15/0004 |
| 2023/0009201 A1 * | 1/2023 | Nott | G06N 20/00 |

FOREIGN PATENT DOCUMENTS

| | | | | |
|---|---|---|---|---|
| CN | 109643098 A | * | 4/2019 | ............ B23P 17/04 |
| WO | 2005072917 A1 | | 8/2005 | |
| WO | 2008092800 A1 | | 8/2008 | |
| WO | 2016109721 A1 | | 7/2016 | |
| WO | 2017081029 A2 | | 5/2017 | |
| WO | WO-2017187106 A1 | * | 11/2017 | ............ B25J 13/089 |
| WO | WO-2018226533 A1 | * | 12/2018 | ............ B25J 11/0075 |

OTHER PUBLICATIONS

International Search Report and Written Opinion of the International Searching Authority in counterpart International PCT Application No. PCT/US2019/048305 dated Nov. 20, 2019.
International Search Report and Written Opinion of the International Searching Authority in counterpart International PCT Application No. PCT/US2019/048362 dated Nov. 21, 2019.
International Search Report and Written Opinion of the International Searching Authority in counterpart International PCT Application No. PCT/US2019/048369 dated Nov. 20, 2019.
International Search Report and Written Opinion of the International Searching Authority in counterpart International PCT Application No. PCT/US2019/048318 dated Nov. 21, 2019.
International Search Report and Written Opinion of the International Searching Authority in counterpart International PCT Application No. PCT/US2019/048375 dated Nov. 21, 2019.
Non-Final Office Action issued in counterpart U.S. Appl. No. 16/552,949 dated Nov. 27, 2019.
Final Office Action issued in related U.S. Appl. No. 16/552,949 dated Apr. 16, 2020.
International Search Report and Written Opinion, dated Oct. 29, 2019, received in counterpart International Application No. PCT/US2019/048257, 10 pgs.

* cited by examiner

34 manipulate one or more of the mobile base assembly, the head assembly and the arm assembly to apply a coating material to the work surface via the head assembly (100)

controlling the movement of the mobile base assembly within the work area (102)

extending / retracting the arm assembly with respect to the mobile base assembly (104)

controlling the location of the head assembly with respect to the work surface and/or the mobile base assembly (106)

controlling the velocity of the head assembly with respect to the work surface and/or the mobile base assembly (108)

rotating the head assembly with respect to the work surface (110)

controlling the angle of incidence of the head assembly with respect to the work surface (112)

controlling a spray fan width of the coating material applied to the work surface via the head assembly (114)

controlling the volume of the coating material provided to the head assembly (116)

controlling the pressure of the coating material provided to the head assembly (118)

FIG. 2

AUTOMATED CONSTRUCTION ROBOT SYSTEMS AND METHODS

RELATED APPLICATION(S)

This application claims the benefit of the following U.S. Provisional Application No. 62/723,137, filed on 27 Aug. 2018 and 62/851,336, filed on 22 May 2019, their entire contents of which are herein incorporated by reference.

TECHNICAL FIELD

This disclosure relates to automated robot systems and, more particularly, to automated robot systems for use within the building trades and the construction industry.

BACKGROUND

The robotics industry is enabling the automation of tedious and/or repetitive tasks. Numerous industries (such as the consumer electronics industry and the automotive industry) make extensive use of robotics. And through the use of robotics, a higher level of worker safety may be realized (as robots may be utilized in dangerous environments). Further, a higher level of predictability may be achieved, as robots may continuously and repeatedly perform that same task with a high level of consistency.

Unfortunately, certain industries have been slower to adopt robotic technology. For example, the building trades and the construction industry have been slower to utilizes such technology due to the mobility requirements of the robots and the transient nature of the job locations.

SUMMARY OF DISCLOSURE

Concept 3

In one implementation, an automated construction robot system includes: a mobile base assembly configured to be displaceable within the work area; a head assembly configured to process a work surface; an arm assembly configured to moveably-couple the head assembly and the mobile base assembly and controllably-displace the head assembly with respect to the work surface; a machine vision system configured to scan a target area and generate target area information; and a computational system configured to: process the target area information to identify a surface defect, generate one or more remedial instructions based, at least in part, upon the surface defect identified, and manipulate one or more of the mobile base assembly, the head assembly and the arm assembly based, at least in part, upon the one or more remedial instructions.

One or more of the following features may be included. Manipulating one or more of the mobile base assembly, the head assembly and the arm assembly based, at least in part, upon the one or more remedial instructions may include one or more of: utilizing the head assembly to sand the surface defect identified; utilizing the head assembly to apply joint compound to the surface defect identified; utilizing the head assembly to apply joint tape to the surface defect identified; utilizing the head assembly to set a protruding drywall screw within the surface defect identified; and utilizing the head assembly to set a protruding nail within the surface defect identified. The surface defect identified may include one or more of: a high spot within the work surface; a low spot within the work surface; a crack within the work surface; a hole within the work surface; a protruding screw within the work surface; and a protruding nail within the work surface. The computational system may be further configured to: manipulate one or more of the mobile base assembly, the head assembly and the arm assembly to apply a coating material to the work surface via the head assembly. Manipulating one or more of the mobile base assembly, the head assembly and the arm assembly to apply a coating material to the work surface via the head assembly may include one or more of: controlling the movement of the mobile base assembly within a work area; extending/retracting the arm assembly with respect to the mobile base assembly; controlling the location of the head assembly with respect to the work surface and/or the mobile base assembly; controlling the velocity of the head assembly with respect to the work surface and/or the mobile base assembly; rotating the head assembly with respect to the work surface; and controlling the angle of incidence of the head assembly with respect to the work surface. Manipulating one or more of the mobile base assembly, the head assembly and the arm assembly to apply a coating material to the work surface via the head assembly may include one or more of: controlling a spray fan width of the coating material applied to the work surface via the head assembly; controlling the volume of the coating material provided to the head assembly; and controlling the pressure of the coating material provided to the head assembly. The arm assembly may include: a wrist assembly configured to enable the rotation of the head assembly with respect to the arm assembly. The arm assembly may include: a rotation assembly configured to enable the rotation of the arm assembly with respect to the mobile base assembly. The automated construction robot system may include a plurality of automated construction robots. The plurality of automated construction robots may include: a primary construction robot; and a scout construction robot. The scout construction robot may be configured to scan the target area and generate the target area information.

In another implementation, a computer-implemented method is executed on an automated construction robot system and includes: processing target area information to identify a surface defect; generating one or more remedial instructions based, at least in part, upon the surface defect identified; and manipulating one or more of a mobile base assembly, a head assembly and an arm assembly based, at least in part, upon the one or more remedial instructions; wherein: the mobile base assembly is configured to be displaceable within a work area, the head assembly is configured to process the work surface, and the arm assembly is configured to moveably-couple the head assembly and the mobile base assembly and controllably-displace the head assembly with respect to the work surface.

One or more of the following features may be included. Manipulating one or more of the mobile base assembly, the head assembly and the arm assembly based, at least in part, upon the one or more remedial instructions may include one or more of: utilizing the head assembly to sand the surface defect identified; utilizing the head assembly to apply joint compound to the surface defect identified; utilizing the head assembly to apply joint tape to the surface defect identified; utilizing the head assembly to set a protruding drywall screw within the surface defect identified; and utilizing the head assembly to set a protruding nail within the surface defect identified. The surface defect identified may include one or more of: a high spot within the work surface; a low spot within the work surface; a crack within the work surface; a hole within the work surface; a protruding screw within the work surface; and a protruding nail within the work surface. The arm assembly may include: a wrist assembly configured to enable the rotation of the head assembly with respect to the arm assembly. The arm assembly may include: a rotation assembly configured to enable the rotation of the arm assembly with respect to the mobile base assembly.

In another implementation, a computer program product resides on a computer readable medium having a plurality of instructions stored thereon. When executed by an automated construction robot system, these instructions cause the automated construction robot system to perform operations including: processing target area information to identify a surface defect; generating one or more remedial instructions based, at least in part, upon the surface defect identified; and manipulating one or more of a mobile base assembly, a head assembly and an arm assembly based, at least in part, upon the one or more remedial instructions; wherein: the mobile base assembly is configured to be displaceable within a work area, the head assembly is configured to process the work surface, and the arm assembly is configured to moveably-couple the head assembly and the mobile base assembly and controllably-displace the head assembly with respect to the work surface.

One or more of the following features may be included. Manipulating one or more of the mobile base assembly, the head assembly and the arm assembly based, at least in part, upon the one or more remedial instructions may include one or more of: utilizing the head assembly to sand the surface defect identified; utilizing the head assembly to apply joint compound to the surface defect identified; utilizing the head assembly to apply joint tape to the surface defect identified; utilizing the head assembly to set a protruding drywall screw within the surface defect identified; and utilizing the head assembly to set a protruding nail within the surface defect identified. The surface defect identified may include one or more of: a high spot within the work surface; a low spot within the work surface; a crack within the work surface; a hole within the work surface; a protruding screw within the work surface; and a protruding nail within the work surface. The arm assembly may include: a wrist assembly configured to enable the rotation of the head assembly with respect to the arm assembly. The arm assembly may include: a rotation assembly configured to enable the rotation of the arm assembly with respect to the mobile base assembly.

The details of one or more implementations are set forth in the accompanying drawings and the description below. Other features and advantages will become apparent from the description, the drawings, and the claims.

BRIEF DESCRIPTION OF THE DRAWINGS

FIG. 2 is a flowchart of an automated construction robot process executed by the automated construction robot system of FIGS. 1A-1E according to an embodiment of the present disclosure;

Like reference symbols in the various drawings indicate like elements.

DETAILED DESCRIPTION OF THE PREFERRED EMBODIMENTS

System Overview

Figure 1A:
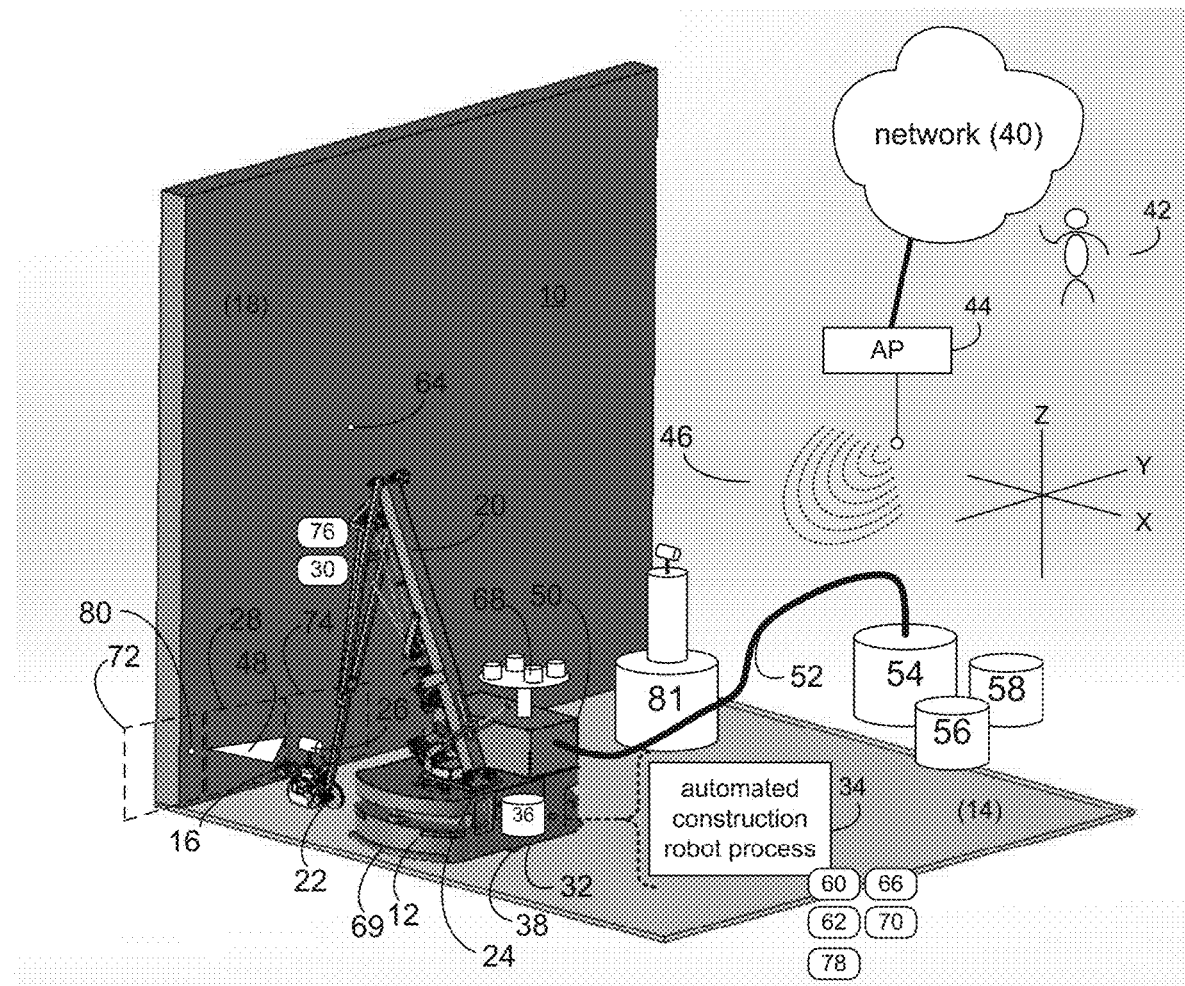
FIGS. 1A-1E are diagrammatic views of an automated construction robot system according to an embodiment of the present disclosure.

Referring to FIGS. 1A-1E, there is shown automated construction robot system 10, wherein automated construction robot system 10 may include mobile base assembly 12 configured to be displaceable within work area 14. Examples of mobile base assembly 12 may include any kind of base assembly that would allow for the movement of automated construction robot system 10 within work area 14. One example of mobile base assembly 12 may include but is not limited to a mobile base assembly that includes a plurality of wheels that allow for the movement of mobile base assembly 12 within work area 14, wherein such a wheeled mobile base assembly may be highly suitable for situations in which work area 14 is a smooth surface (e.g., a finished floor). Another example of mobile base assembly 12 may include but is not limited to a mobile base assembly that includes a plurality of tracks (not shown) that allow for the movement of mobile base assembly 12 within work area 14, wherein such a tracked mobile base assembly may be highly suitable for situations in which work area 14 is a rough surface (e.g., uneven ground).

Automated construction robot system 10 may include head assembly 16 configured to process work surface 18. As will be discussed below in greater detail, examples of work surface 18 may include but are not limited to interior walls, exterior walls, trim work, door assemblies, and window assemblies. As will also be discussed below in greater detail, head assembly 16 may be configured to apply a coating material (e.g., a sealer coating, a primer coating, a paint coating, a stain coating, a varnish coating, a polyurethane coating, and an epoxy-based coating) to work surface 18. Further and as will be discussed below in greater detail, head assembly 16 may be configured to make repairs to work surface 18.

Automated construction robot system 10 may include arm assembly 20 configured to moveably-couple head assembly 16 and mobile base assembly 12 and controllably-displace head assembly 16 with respect to work surface 18. Examples of arm assembly 20 may include any hydraulically-actuated, pneumatically-actuated, and/or electrically-actuated, computer-controllable arm assembly that may be configured to movably-couple head assembly 16 and mobile base assembly 12.

Arm assembly 20 may include wrist assembly 22 configured to enable the rotation of head assembly 16 with respect to arm assembly 20. Examples of wrist assembly 22 may include any assembly that allows for the rotation of head assembly 16 about an X-axis, a Y-axis, and/or a Z-axis.

Arm assembly 20 may include rotation assembly 24 configured to enable the rotation of arm assembly 20 with respect to mobile base assembly 12. Examples of rotation assembly 24 may include any assembly that allows for the rotation of arm assembly 20 about a Z-axis.

Automated construction robot system 10 may include machine vision system 26 configured to scan a target area (e.g., target area 28) and generate target area information 30. Examples of machine vision system 26 may include but are not limited to one or more of an RGB imaging system, an infrared imaging system, an ultraviolet imaging system, a laser imaging system, a SONAR imaging system, a RADAR imaging system, and a thermal imaging system. Examples of target area information 30 may include but is not limited to any analog and/or digital representation of target area 28 that enables (as will be discussed below in greater detail) automated construction robot system 10 to process target area 28 and control one or more of mobile base assembly 12, head assembly 16, arm assembly 20, wrist assembly 22, rotation assembly 24 and machine vision system 26.

As will be disclosed below in greater detail, automated construction robot system 10 may include computational system 32 configured to execute automated construction robot process 34 and enable the interfacing with (and controlling of) one or more of mobile base assembly 12, head assembly 16, arm assembly 20, wrist assembly 22, rotation assembly 24 and machine vision system 26.

The instruction sets and subroutines of automated construction robot process 34, which may be stored on storage device 36 coupled to computational system 32, may be executed by one or more processors (not shown) and one or more memory architectures (not shown) included within computational system 32. Examples of storage device 36 may include but are not limited to: a hard disk drive; a RAID device; a random access memory (RAM); a read-only memory (ROM); and all forms of flash memory storage devices.

Automated construction robot system 10 may be coupled to network 40 to e.g., allow automated construction robot system 10 to be controlled by user 42, allow for the receiving of instructions by automated construction robot system 10, and allow for the providing of data (e.g., status data, progress data, defect data, etc.) to user 42. For example, automated construction robot system 10 may be configured to be wirelessly coupled to access point 44 via wireless communication channel 46 established between automated construction robot system 10 and access point 44.

Examples of network 40 may include but are not limited to any type of wired or wireless network (e.g., a local area network; a wide area network; a wifi network, a cellular network, the internet and/or an intranet). Examples of access point 44 may include, but are not limited to, an IEEE 802.11a/b/g/n access point, a Wi-Fi access point, and/or a Bluetooth access point that is capable of establishing wireless communication channel 46 between automated construction robot system 10 and access point 44.

As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Concept 1 (Automated Application)

As discussed above, automated construction robot system 10 may include computational system 32 configured to execute automated construction robot process 34 and enable the interfacing with (and controlling of) one or more of mobile base assembly 12, head assembly 16, arm assembly 20, wrist assembly 22, rotation assembly 24 and machine vision system 26.

Accordingly and referring also to FIG. 2, automated construction robot process 34 may be configured to manipulate 100 one or more of mobile base assembly 12, head assembly 16 and arm assembly 20 to apply coating material 48 (e.g., a sealer coating, a primer coating, a paint coating, a stain coating, a varnish coating, a polyurethane coating, and an epoxy-based coating) to work surface 18 via head assembly 16.

Coating material 48 may be locally or remotely provided. For example, automated construction robot system 10 may include an internal chamber (e.g., internal chamber 50) within which coating material 48 may be stored. For example, internal chamber 50 may be configured so that user 42 of automated construction robot system 10 may fill internal chamber 50 with coating material 48 from e.g., a supply bucket/container. Alternatively, automated construction robot system 10 may be configured to receive coating material 48 from an external container. For example, supply line assembly 52 may be configured to be coupled to external container 54 (that may contain coating material 48). Additional external containers (e.g., flushing fluid supply container 56 and flushing fluid receipt container 58) may be utilized by automated construction robot system 10 to effectuate the cleaning of the same (wherein supply line assembly 52 may be placed into flushing fluid supply container 56 and head assembly 16 may be positioned to discharge into flushing fluid receipt container 58).

When manipulating 100 one or more of mobile base assembly 12, head assembly 16 and arm assembly 20 to apply coating material 48 to work surface 18 via head assembly 16, automated construction robot process 34 perform one or more of the following operations:

Controlling 102 the movement of mobile base assembly 12 within work area 14. For example, automated construction robot process 34 may be configured to control 102 the movement of mobile base assembly 12 in the X-axis (perpendicular to work surface 18) and/or Y-axis (parallel to work surface 18). Specifically, automated construction robot process 34 may be configured to repeatedly move mobile base assembly 12 along the Y-axis to allow for the continued application of coating material 48 to work surface 18.

Extending/retracting 104 arm assembly 20 with respect to mobile base assembly 12. For example, automated construction robot process 34 may be configured to extend/retract 104 arm assembly 20, resulting in the displacement of head assembly 16 in the X-axis, Y-axis and/or Z-axis and the positioning of head assembly 16 with respect to work surface 18.

Controlling 106 the location of head assembly 16 with respect to work surface 18 and/or mobile base assembly 12. For example, automated construction robot process 34 may be configured to control arm assembly 20, wrist assembly 22 and/or rotation assembly 24 to control 106 the location of head assembly 16 with respect to work surface 18 and/or mobile base assembly 12. Specially, automated construction robot process 34 may control 106 the location of head assembly 16 to e.g., move head assembly 16 along the Z-axis and apply coating material 48 in vertical stripes along work surface 18. Further, automated construction robot process 34 may control 106 the location of head assembly 16 to e.g., move head assembly 16 along the Y-axis and apply coating material 48 in horizontal stripes along work surface 18. Additionally, automated construction robot process 34 may control 106 the location of head assembly 16 to e.g., move head assembly 16 along the X-axis (i.e., toward and away from work surface 18) to vary the width of the stripe of coating material 48 applied to work surface 18.

Controlling 108 the velocity of head assembly 16 with respect to work surface 18 and/or mobile base assembly 12. For example, automated construction robot process 34 may be configured to control the rate at which arm assembly 20 moves, control the rate at which wrist assembly 22 moves and/or control the rate at which rotation assembly 24 moves to control 108 the velocity of head assembly 16 with respect to work surface 18 and/or mobile base assembly 12. Specifically, by controlling 108 the velocity of head assembly 16 (with respect to work surface 18), the thickness of coating material 48 applied to work surface 18 may be regulated.

Figure 1B:
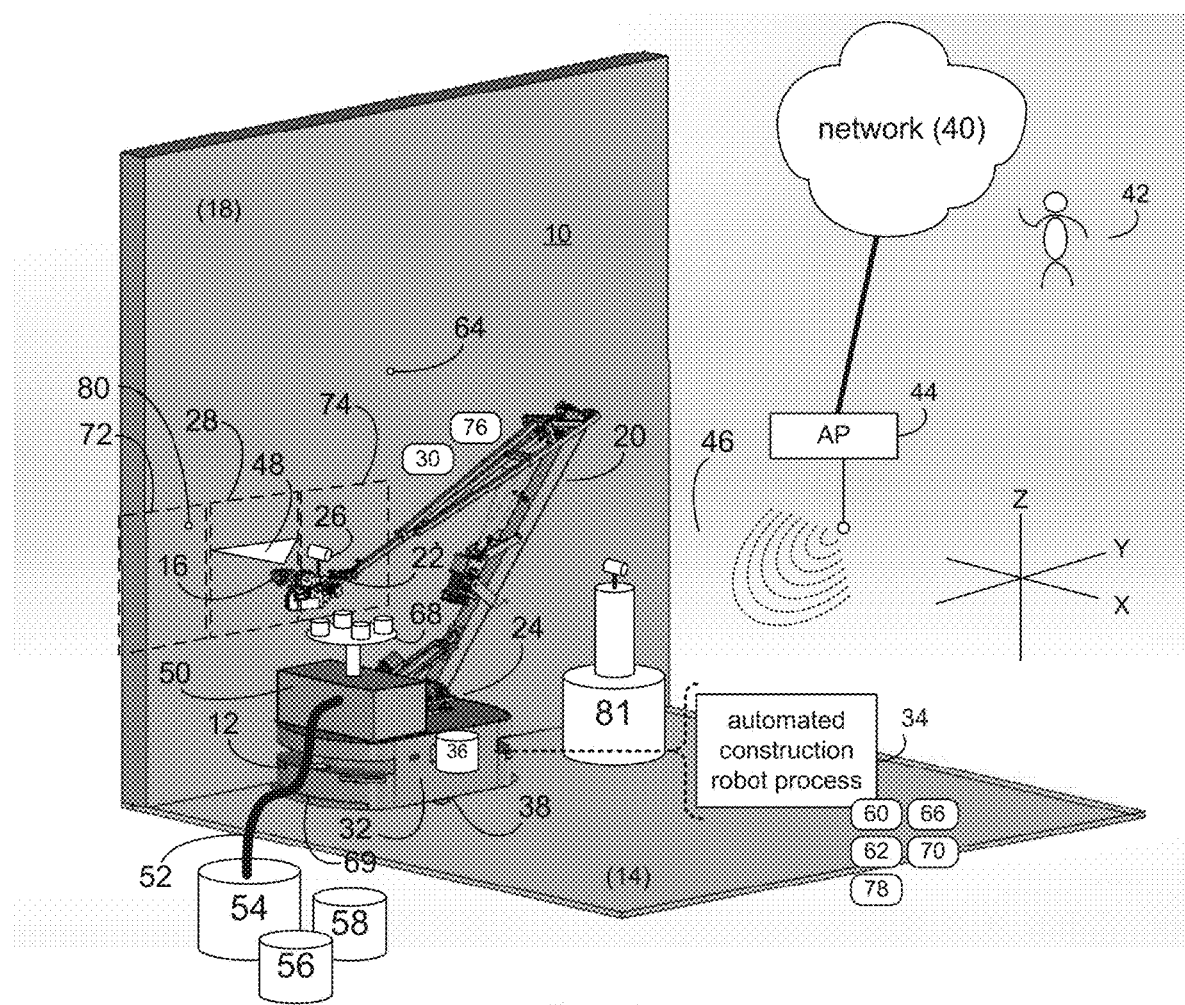
Figure 1C:
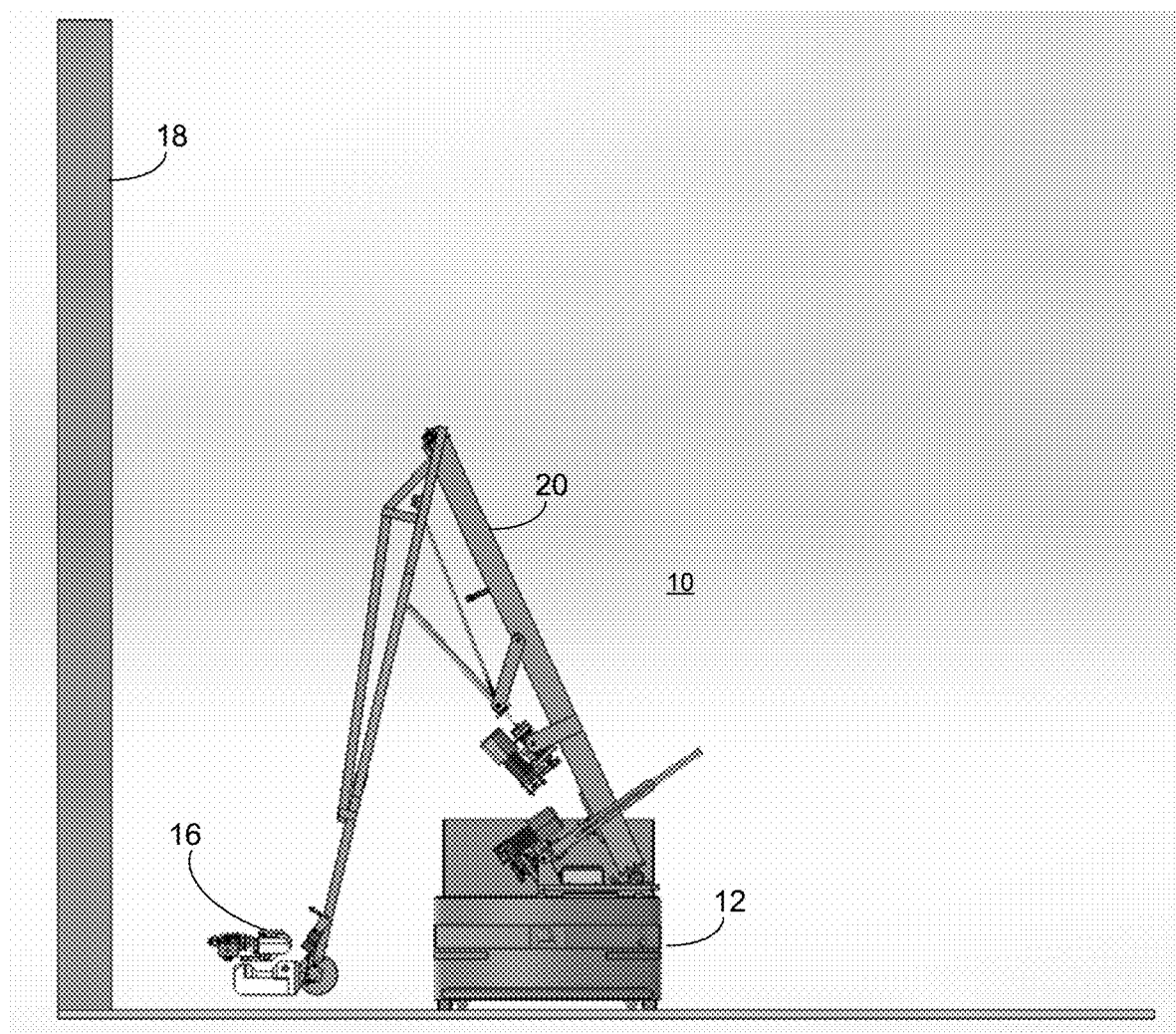
Figure 1D:
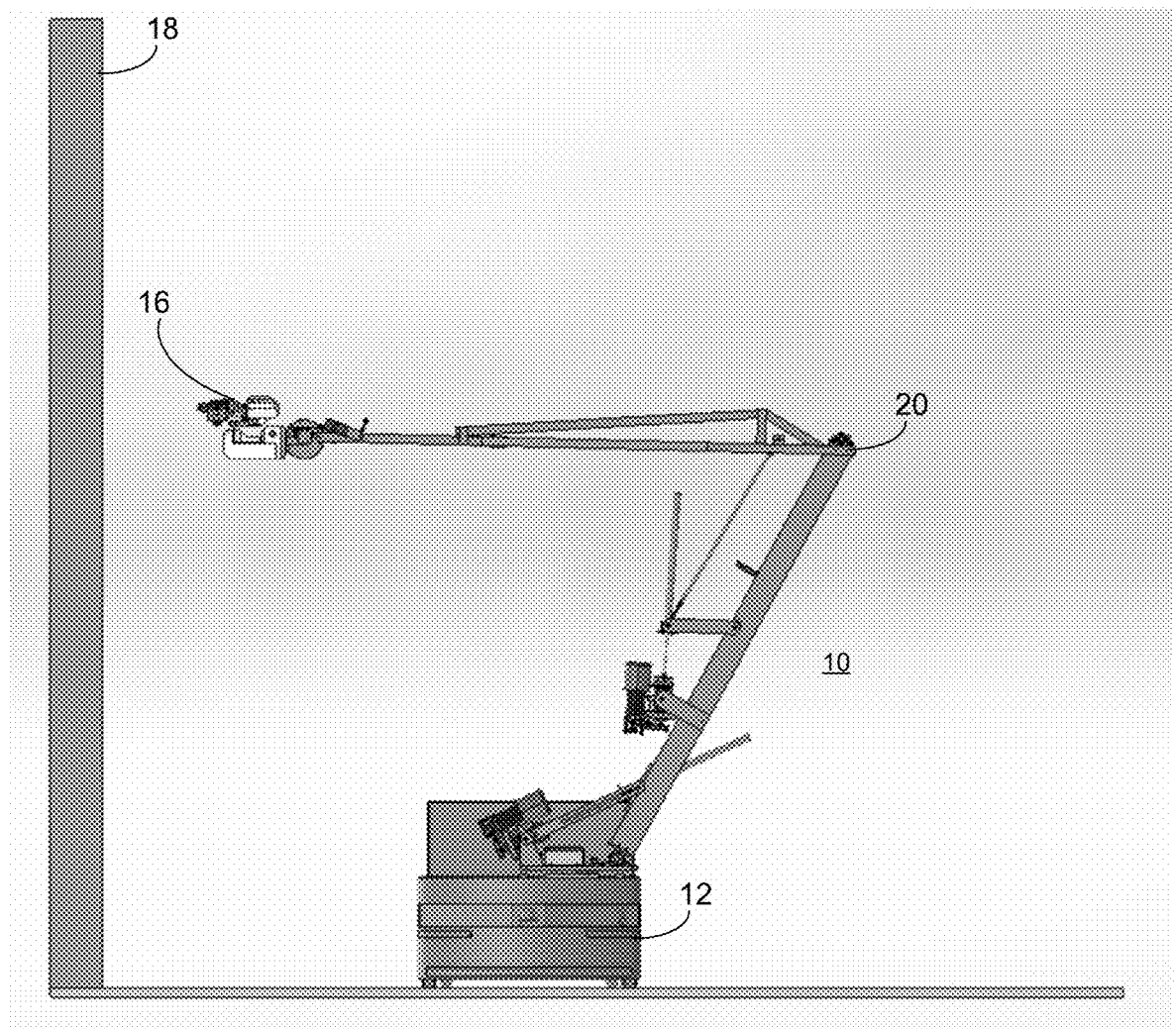
Figure 1E:
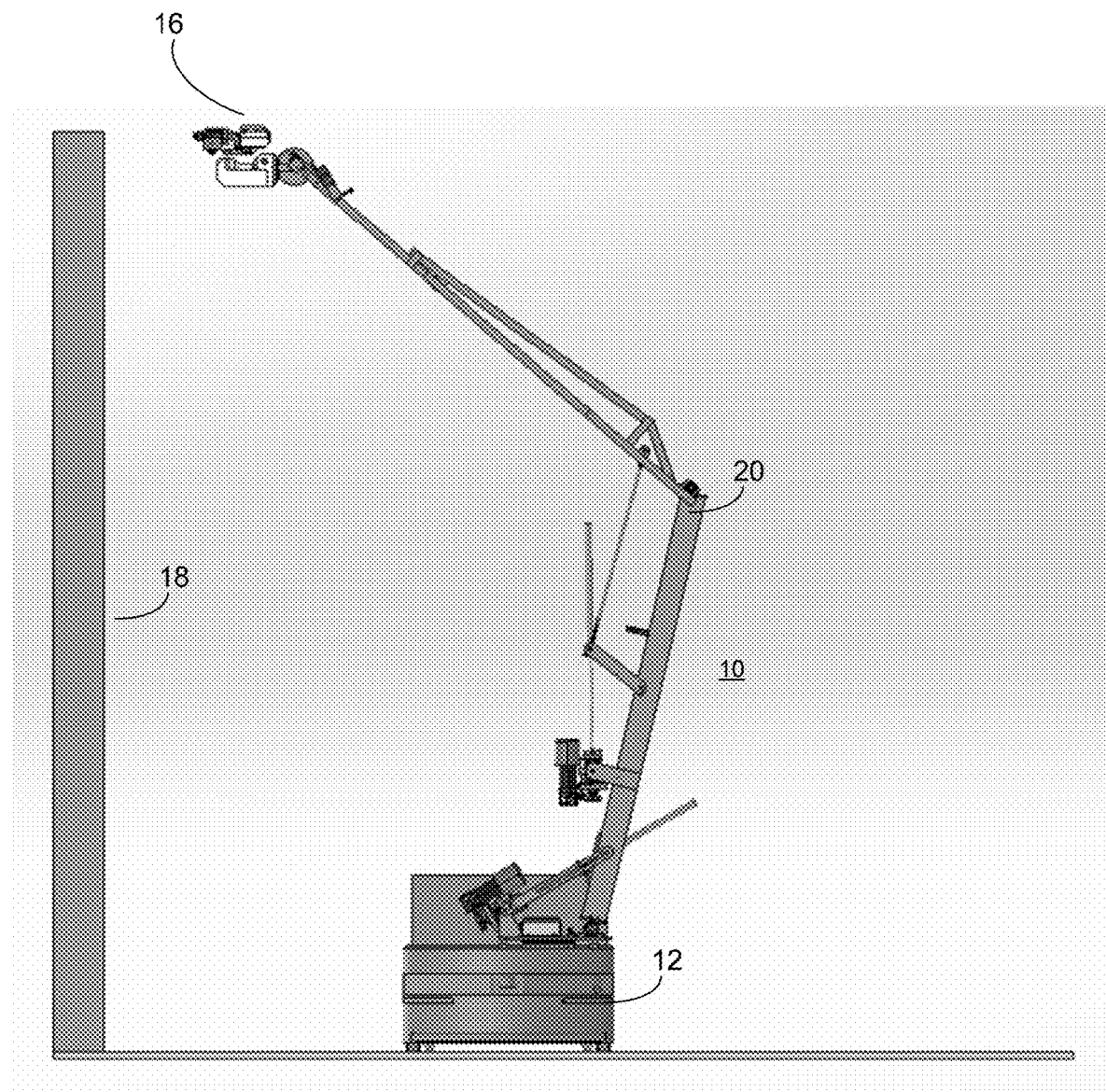

Rotating 110 head assembly 16 with respect to work surface 18. For example, automated construction robot process 34 may be configured to control wrist assembly 22, thus enabling the rotation of head assembly 16 about an X-axis, a Y-axis, and/or a Z-axis. For example, if head assembly 16 is positioned to generate a horizontal spray fan (as shown in FIGS. 1A-1B) when applying coating material 48, head assembly 16 may be displaced in the Z-axis to generate a vertical stripe of coating material 48. Alternatively, automated construction robot process 34 may rotate 110 head assembly 16 ninety degrees about the X-axis, thus positioning head assembly 16 to generate a vertical spray fan (not shown) when applying coating material 48, thus allowing head assembly 16 to be displaced in the Y-axis to generate a horizontal stripe of coating material 48.

Figure 3:
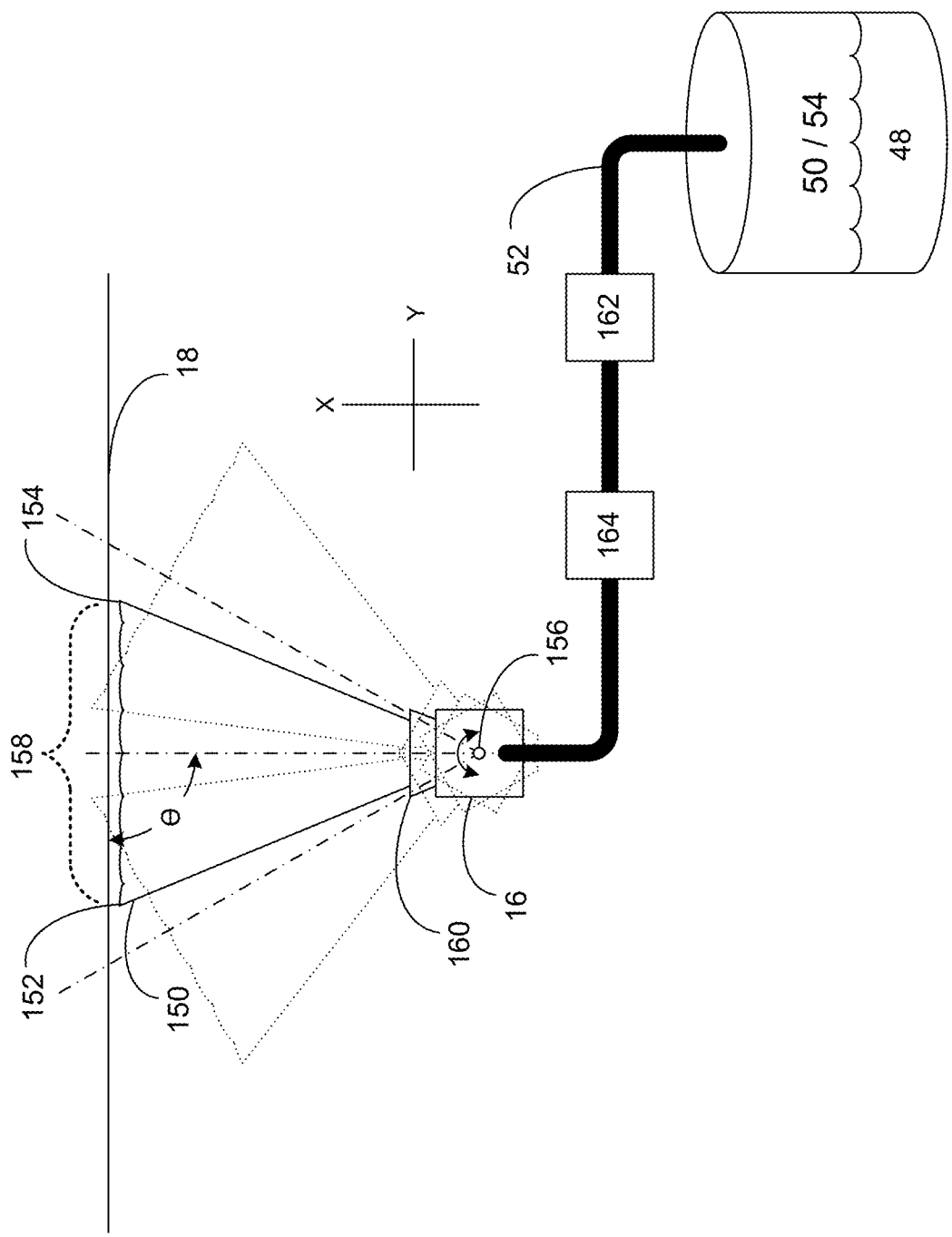
FIG. 3 is a diagrammatic detail view of the head assembly of FIGS. 1A-1E according to an embodiment of the present disclosure.

Controlling 112 the angle of incidence (Θ) of head assembly 16 with respect to work surface 18. Referring also to FIG. 3, the angle of incidence (Θ) is the angle between a ray incident on a surface (e.g., work surface 18) and the line perpendicular to the surface at the point of incidence. Accordingly and when spray fan 150 is positioned perpendicular to work surface 18 (as shown in solid lines), the angle of incidence (Θ) is 90 degrees. This may result in a decrease in the crispness of the edges 152, 154 of coating material 48 applied to work surface 18. However, rotating spray fan 150 about pivot point 156 included within wrist assembly 22 in a clockwise/counterclockwise direction may result in a decrease in the angle of incidence (Θ) and an increase in the crispness of: the edge 152 (when rotating in a clockwise direction); and edge 154 (when rotating in a counterclockwise direction).

Controlling 114 a spray fan width (e.g., spray fan width 158) of coating material 48 applied to work surface 18 via head assembly 16. For example, nozzle assembly 160 of head assembly 16 may be a variable geometry nozzle assembly that is configurable to allow for adjustment of spray fan width 158 (thus allowing for the increase/decrease of spray fan width 158).

Controlling 116 the volume of coating material 48 provided to head assembly 16. For example, supply line assembly 52 may be utilized to receive coating material 48 from a coating supply system (e.g., internal chamber 50 or external container 54). Pump assembly 162 may be utilized to pressurize coating material 48 (drawn from internal chamber 50/external container 54) and variable-duty-cycle microcontroller assembly 164 may be utilized to control 116 the volume of coating material 48 provided to head assembly 16, wherein pump assembly 162 and/or variable-duty-cycle microcontroller assembly 164 may be controllable by automated construction robot process 34 (as will be discussed below in greater detail).

Controlling 118 the pressure of coating material 48 provided to head assembly 16. For example, supply line assembly 52 may be utilized to receive coating material 48 from a coating supply system (e.g., internal chamber 50 or external container 54). Pump assembly 162 may be utilized to pressurize coating material 48 (drawn from internal chamber 50/external container 54) and variable-duty-cycle microcontroller assembly 164 may be utilized to control 118 the pressure of coating material 48 provided to head assembly 16, wherein pump assembly 162 and/or variable-duty-cycle microcontroller assembly 164 may be controllable by automated construction robot process 34 (as will be discussed below in greater detail).

Concept 2 (Generation of a Coating Plan)

As discussed above, automated construction robot system 10 may include computational system 32 configured to execute automated construction robot process 34 and enable the interfacing with (and controlling of) one or more of mobile base assembly 12, head assembly 16, arm assembly 20, wrist assembly 22, rotation assembly 24 and machine vision system 26.

Further and as discussed above, automated construction robot system 10 may include machine vision system 26 configured to scan a target area (e.g., target area 28) and generate target area information 30. When scanning target area 28 to generate target area information 30, automated construction robot process 34 may manipulate and maneuver automated construction robot system 10 (generally) and mobile base assembly 12 (specifically) so that machine vision system 26 may scan the entirety of work surface 18 to generate target area information 30.

Figure 4:
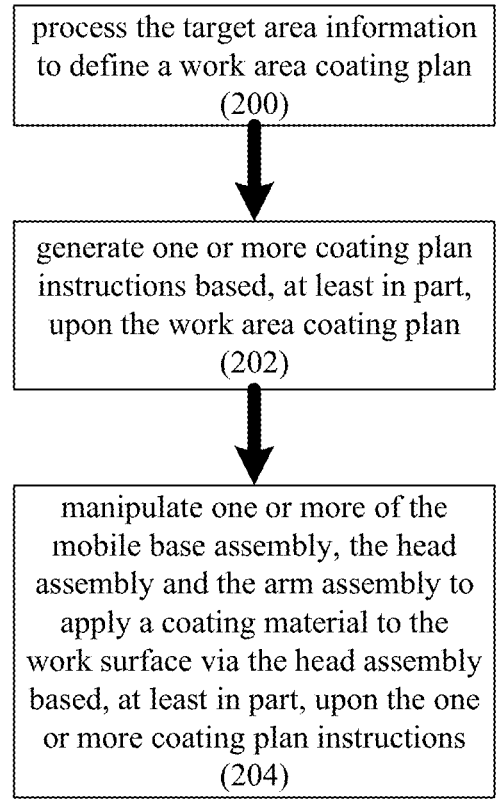
FIG. 4 is a another flowchart of an automated construction robot process executed by the automated construction robot system of FIGS. 1A-1E according to an embodiment of the present disclosure.

Referring also to FIG. 4, automated construction robot process 34 may be configured to process 200 target area information 30 to define work area coating plan 60. For this example, assume that work surface 18 is a room that includes four walls, two doors, two windows, six electrical outlets and two light switches. Accordingly, automated construction robot process 34 may process 200 target area information 30 to locate such walls, doors, windows, electrical outlets and light switches within work surface 18 and define work area coating plan 60.

Once work area coating plan 60 is defined, automated construction robot process 34 may generate 202 one or more coating plan instructions (e.g., coating plan instructions 62) based, at least in part, upon work area coating plan 60. Generally, coating plan instructions 62 may instruct the various portions of automated construction robot system 10

(e.g., mobile base assembly 12, head assembly 16, arm assembly 20, wrist assembly 22, rotation assembly 24 and machine vision system 26) to apply coating material 48 to whatever portions of work surface 18 need to be coated (e.g. bare drywall) while not applying coating material 48 to whatever portions of work surface 18 should not be coated (e.g. doors, windows, electrical outlets, light switches). For example, if the first wall within work surface 18 is 10' high and 50' long (with a 4' wide by 7' high door located in the center of that first wall), the coating plan instructions (e.g., coating plan instructions 62) generated 202 may instruct the various portions of automated construction robot system 10 (e.g., mobile base assembly 12, head assembly 16, arm assembly 20, wrist assembly 22, rotation assembly 24 and machine vision system 26) to e.g., applying coating material 48 from the floor to a height of 10' for the first 23' of the first wall . . . and then apply coating material 48 from 8' to 10' for the next 4' of the first wall . . . and then apply coating material 48 from the floor to a height of 10' for the remaining 23' of the first wall.

Once coating plan instructions 62 are generated 202, automated construction robot process 34 may manipulate 204 one or more of mobile base assembly 12, head assembly 16 and arm assembly 20 to apply coating material 48 to work surface 18 via head assembly 12 based, at least in part, upon one or more of the coating plan instructions (e.g., coating plan instructions 62). For example, assume that head assembly 12 applies coating material 48 in e.g., a 12" wide stripe. Accordingly, automated construction robot process 34 may manipulate 204 the various portions of automated construction robot system 10 (e.g., mobile base assembly 12, head assembly 16, arm assembly 20, wrist assembly 22, rotation assembly 24 and machine vision system 26) to apply twenty-three 12" wide vertical stripes of coating material 48 from floor level to 10' high . . . and then apply four 12" wide vertical stripes of coating material 48 from 8' feet high to 10' feet high . . . and then apply twenty-three 12" wide vertical stripes of coating material 48 from floor level to 10' high.

Depending upon how automated construction robot process 34 is configured, automated construction robot process 34 may overlap these stripes of coating material 48 to ensure consistent coverage.

Concept 3 (Automated Repair)

As discussed above, automated construction robot system 10 may include computational system 32 configured to execute automated construction robot process 34 and enable the interfacing with (and controlling of) one or more of mobile base assembly 12, head assembly 16, arm assembly 20, wrist assembly 22, rotation assembly 24 and machine vision system 26.

Further and as discussed above, automated construction robot system 10 may include machine vision system 26 configured to scan a target area (e.g., target area 28) and generate target area information 30. When scanning target area 28 to generate target area information 30, automated construction robot process 34 may manipulate and maneuver automated construction robot system 10 (generally) and mobile base assembly 12 (specifically) so that machine vision system 26 may scan the entirety of work surface 18 to generate target area information 30.

Figure 5:
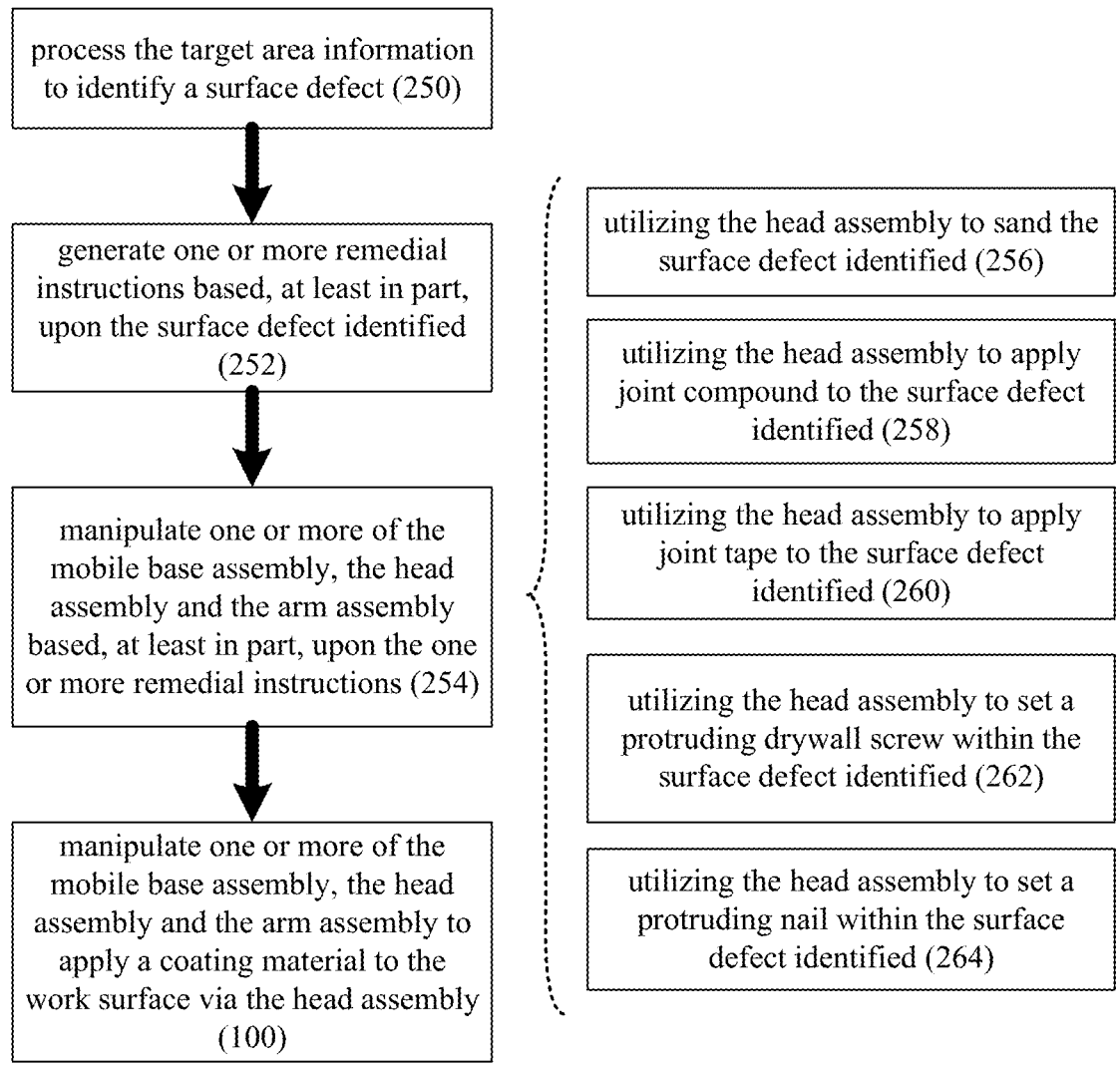
FIG. 5 is a another flowchart of an automated construction robot process executed by the automated construction robot system of FIGS. 1A-1E according to an embodiment of the present disclosure.

Referring also to FIG. 5, automated construction robot process 34 may be configured to process 250 target area information 30 to identify any surface defects (e.g., surface defect 64). As is known, when drywall is installed, the seams and interior corners are covered with a combination of joint tape and drywall compound. And the fasteners that attach the drywall to the underlying studs are fastened via drywall screws and/or drywall nails, wherein the heads of such fasteners are also covered with drywall compound. Further, exterior corners are covered with corner bead that is fastened with either drywall screws or drywall nails, wherein this corner bead and these fasteners are covered with drywall compound.

And while all surface defects are supposed to be addressed during the finishing of the drywall, surface defects are routinely missed and need to be addressed prior to the application of coating material 48. Evidence of such surface defects (e.g., surface defect 64) may be memorialized (e.g., via stored images and/or videos) to document such surface defects and provide evidence of the same for reimbursement purposes from third parties (e.g., the drywall installers).

Examples of such surface defects (e.g., surface defect 64) may include but are not limited to one or more of:

A High Spot within the Work Surface 18: For example, a portion of drywall compound that was applied to work surface 18 may have been insufficiently sanded, resulting in a high spot within work surface 18 that needs to be repaired.

A Low Spot within Work Surface 18: For example, an insufficient quantity of drywall compound may have been applied to work surface 18, resulting in a depression within work surface 18 that needs to be repaired.

A Crack within Work Surface 18: For example, a joint within the drywall, or an interior/exterior corner may be been insufficiently taped, resulting in a crack within work surface 18 that needs to be repaired.

A Hole within Work Surface 18: For example, damage to a piece of drywall may have occurred, resulting in a hole within work surface 18 that needs to be repaired.

A Protruding Screw within Work Surface 18: For example, a drywall screw may have been insufficiently set within work surface 18, resulting in a protruding screw head within work surface 18 that needs to be repaired.

A Protruding Nail within Work Surface 18: For example, a drywall nail may have been insufficiently set within work surface 18, resulting in a protruding nail head within work surface 18 that needs to be repaired.

Once a surface defect (e.g., surface defect 64) is identified, automated construction robot process 34 may generate 252 one or more remedial instructions (e.g., remedial instructions 66) based, at least in part, upon the surface defect (e.g., surface defect 64) identified. As would be expected, these remedial instructions (e.g., remedial instructions 66) may vary depending upon the type of surface defect (e.g., surface defect 64) identified.

Accordingly:

A High Spot within the Work Surface 18: For such a surface defect, the remedial instructions (e.g., remedial instructions 66) generated 252 by automated construction robot process 34 may include:
  i. the sanding of work surface 18 to make the surface flat.

A Low Spot within Work Surface 18: For such a surface defect, the remedial instructions (e.g., remedial instructions 66) generated 252 by automated construction robot process 34 may include:
  i. the application of drywall compound to work surface 18 to fill the depression; and
  ii. the sanding of work surface 18 to make the surface flat.

A Crack within Work Surface 18: For such a surface defect, the remedial instructions (e.g., remedial instructions 66) generated 252 by automated construction robot process 34 may include:
  i. the application of drywall compound to work surface 18 to fill the crack; and
  ii. the sanding of work surface 18 to make the surface flat.

A Hole within Work Surface 18: For such a surface defect, the remedial instructions (e.g., remedial instructions 66) generated 252 by automated construction robot process 34 may include:
  i. the application of drywall compound to work surface 18 to fill the hole; and
  ii. the sanding of work surface 18 to make the surface flat.

A Protruding Screw within Work Surface 18: For such a surface defect, the remedial instructions (e.g., remedial instructions 66) generated 252 by automated construction robot process 34 may include:
  i. the setting of the protruding screw;
  ii. the application of drywall compound to work surface 18 to cover the screw head; and
  iii. the sanding of work surface 18 to make the surface flat.

A Protruding Nail within Work Surface 18: For such a surface defect, the remedial instructions (e.g., remedial instructions 66) generated 252 by automated construction robot process 34 may include:
  i. the setting of the protruding nail;
  ii. the application of drywall compound to work surface 18 to cover the nail head; and
  iii. the sanding of work surface 18 to make the surface flat.

Once the remedial instructions (e.g., remedial instructions 66) are generated 252, automated construction robot process 34 may manipulate 254 one or more of mobile base assembly 12, head assembly 16 and arm assembly 20 based, at least in part, upon the one or more remedial instructions (e.g., remedial instructions 66). Generally, remedial instructions 66 may instruct the various portions of automated construction robot system 10 (e.g., mobile base assembly 12, head assembly 16, arm assembly 20, wrist assembly 22, rotation assembly 24 and machine vision system 26) to perform the above-described remedial actions. For example, manipulating 254 one or more of mobile base assembly 12, head assembly 16 and arm assembly based, at least in part, upon the one or more remedial instructions (e.g., remedial instructions 66) may include one or more of:

Utilizing 256 head assembly 12 to sand the surface defect (e.g., surface defect 64) identified. For example, if head assembly 16 is configured to sand the surface defect (e.g., surface defect 64) included within work surface 18, head assembly 16 may be utilized to perform such sanding functionality. In the event that head assembly 16 affixed to arm assembly 20 is not capable of sanding the surface defect (e.g., surface defect 64) identified, a head assembly capable of performing such sanding functionality may be selected by arm assembly 20 from plurality of head assemblies 68.

Utilizing 258 head assembly 12 to apply joint compound to the surface defect (e.g., surface defect 64) identified. For example, if head assembly 16 is configured to apply joint compound to the surface defect (e.g., surface defect 64) included within work surface 18, head assembly 16 may be utilized to perform such joint compound application functionality. In the event that head assembly 16 affixed to arm assembly 20 is not capable of applying joint compound to the surface defect (e.g., surface defect 64) identified, a head assembly capable of performing such joint compound application functionality may be selected by arm assembly 20 from plurality of head assemblies 68.

Utilizing 260 head assembly 12 to apply joint tape to the surface defect (e.g., surface defect 64) identified. For example, if head assembly 16 is configured to apply joint tape to the surface defect (e.g., surface defect 64) included within work surface 18, head assembly 16 may be utilized to perform such joint tape application functionality. In the event that head assembly 16 affixed to arm assembly 20 is not capable of applying joint tape to the surface defect (e.g., surface defect 64) identified, a head assembly capable of performing such joint tape application functionality may be selected by arm assembly 20 from plurality of head assemblies 68.

Utilizing 262 head assembly 12 to set a protruding drywall screw within the surface defect (e.g., surface defect 64) identified. For example, if head assembly 16 is configured to set the protruding screw (e.g., surface defect 64) included within work surface 18, head assembly 16 may be utilized to perform such screw setting functionality. In the event that head assembly 16 affixed to arm assembly 20 is not capable of setting the protruding screw (e.g., surface defect 64), a head assembly capable of performing such screw setting functionality may be selected by arm assembly 20 from plurality of head assemblies 68.

Utilizing 264 head assembly 12 to set a protruding nail within the surface defect (e.g., surface defect 64) identified. For example, if head assembly 16 is configured to set the protruding nail (e.g., surface defect 64) included within work surface 18, head assembly 16 may be utilized to perform such nail setting functionality. In the event that head assembly 16 affixed to arm assembly 20 is not capable of setting the protruding nail (e.g., surface defect 64), a head assembly capable of performing such nail setting functionality may be selected by arm assembly 20 from plurality of head assemblies 68.

Utilizing 256 head assembly 12 to sand the surface defect (e.g., surface defect 64) identified. For example, if head assembly 16 is configured to sand the surface defect (e.g., surface defect 64) included within work surface 18, head Concept 4 (Contact Detection)

As discussed above, automated construction robot system 10 may include computational system 32 configured to execute automated construction robot process 34 and enable the interfacing with (and controlling of) one or more of mobile base assembly 12, head assembly 16, arm assembly 20, wrist assembly 22, rotation assembly 24 and machine vision system 26.

As discussed above, when scanning target area 28 to generate target area information 30, automated construction robot process 34 may manipulate and maneuver automated construction robot system 10 (generally) and mobile base assembly 12 (specifically) so that machine vision system 26 may scan the entirety of work surface 18 to generate target area information 30. Additionally and as discussed above, automated construction robot process 34 may manipulate 100 one or more of mobile base assembly 12, head assembly 16 and arm assembly 20 to apply coating material 48 to work surface 18 via head assembly 16. Further and as discussed above, automated construction robot process 34 may manipulate 204 one or more of mobile base assembly 12, head assembly 16 and arm assembly 20 to apply coating material 48 to work surface 18 via head assembly 12 based, at least in part, upon one or more the coating plan instructions (e.g., coating plan instructions 62). Additionally and as discussed above, automated construction robot process 34 may manipulate 254 one or more of mobile base assembly 12, head assembly 16 and arm assembly 20 based, at least in part, upon the one or more remedial instructions (e.g., remedial instructions 66). Accordingly, it is foreseeable that one or more of mobile base assembly 12, head assembly 16 and arm assembly 20 may make contact with (or impact) another object, examples of which may include but are not limited to a worker, a wall, and a piece of furniture.

Figure 6:
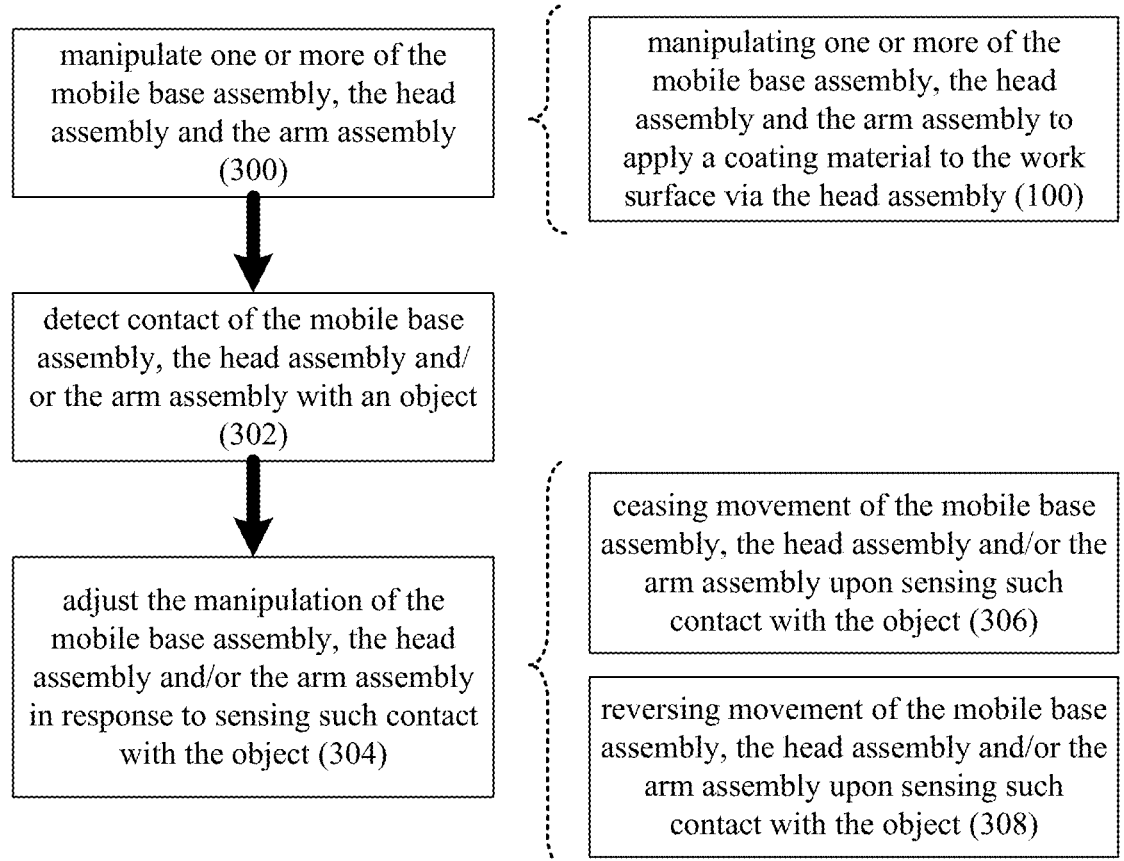
FIG. 6 is a another flowchart of an automated construction robot process executed by the automated construction robot system of FIGS. 1A-1E according to an embodiment of the present disclosure.

Referring also to FIG. 6, when automated construction robot process 34 is manipulating 300 (for any of the reasons discussed above) one or more of mobile base assembly 12, head assembly 66 and arm assembly 20, if contact of mobile base assembly 12, head assembly 16 and/or arm assembly 20 with an object (e.g., user 42) is detected 302, automated construction robot process 34 may adjust 304 the manipulation of mobile base assembly 12, head assembly 16 and/or arm assembly 20 in response to sensing such contact with the object (e.g., user 42).

As discussed above, examples of arm assembly 20 may include any hydraulically-actuated, pneumatically-actuated, and/or electrically-actuated computer-controllable arm assembly that may be configured to movably-couple head assembly 16 and mobile base assembly 12. Accordingly, automated construction robot process 34 may be configured to monitor the hydraulic and/or pneumatic pressures within arm assembly 20 (to detect 302 such a contact event). If electrically actuated, automated construction robot process 34 may be configured to monitor the electrical current within arm assembly 20 (to detect 302 such a contact event). Additionally, touch sensitive bumper assemblies (e.g., bumper assembly 69) may be included within base assembly 12 and configured to detect 302 such a contact event.

When adjusting 304 the manipulation of mobile base assembly 12, head assembly 16 and/or arm assembly 20 in response to sensing such contact with the object (e.g., user 42), automated construction robot process 34 may effectuate one or more of the following operations:

- Ceasing 306 movement of mobile base assembly 12, head assembly 16 and/or arm assembly 20 upon sensing such contact with the object (e.g., user 42). For example and upon detecting 302 such a contact event, automated construction robot process 34 may immediately cease 306 any and all movement of mobile base assembly 12, head assembly 16 and/or arm assembly 20.
- Reversing 308 movement of mobile base assembly 12, head assembly 16 and/or arm assembly 20 upon sensing such contact with the object (e.g., user 42). For example and upon detecting 302 such a contact event, automated construction robot process 34 may immediately reverse 308 any and all movement of mobile base assembly 12, head assembly 16 and/or arm assembly 20.

Concept 6 (Edge Detection & Instruction)

As discussed above, automated construction robot system 10 may include computational system 32 configured to execute automated construction robot process 34 and enable the interfacing with (and controlling of) one or more of mobile base assembly 12, head assembly 16, arm assembly 20, wrist assembly 22, rotation assembly 24 and machine vision system 26.

Further and as discussed above, automated construction robot system 10 may include machine vision system 26 configured to scan a target area (e.g., target area 28) and generate target area information 30. When scanning target area 28 to generate target area information 30, automated construction robot process 34 may manipulate and maneuver automated construction robot system 10 (generally) and mobile base assembly 12 (specifically) so that machine vision system 26 may scan the entirety of work surface 18 to generate target area information 30. As discussed above and for this example, assume that work surface 18 is a room that includes four walls, two doors, two windows, six electrical outlets and two light switches.

Figure 7:
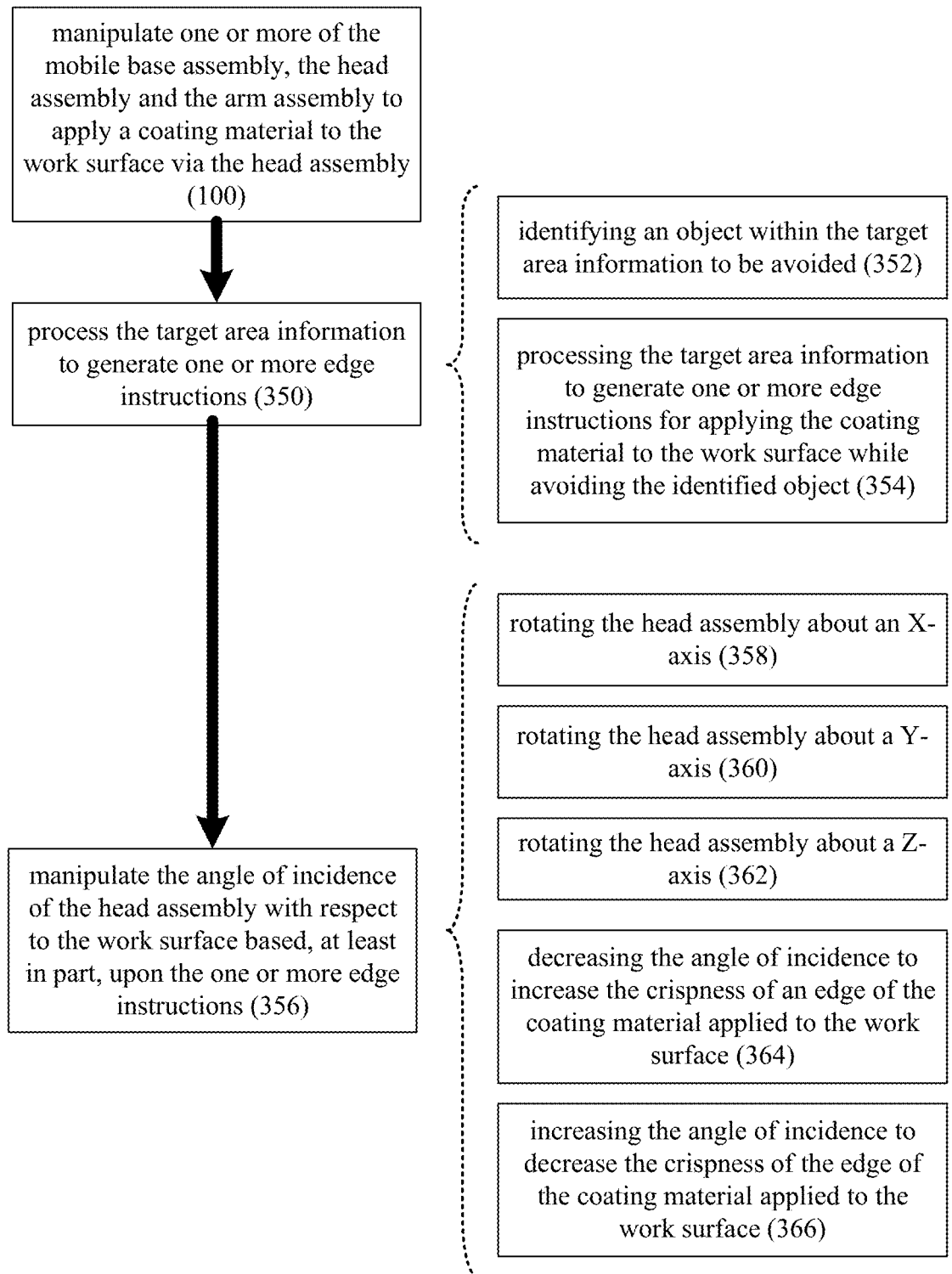
FIG. 7 is a another flowchart of an automated construction robot process executed by the automated construction robot system of FIGS. 1A-1E according to an embodiment of the present disclosure.

Referring also to FIG. 7 and as discussed above, automated construction robot process 34 may be configured to manipulate 100 one or more of mobile base assembly 12, head assembly 16 and arm assembly 20 to apply coating material 48 to work surface 18 via head assembly 16. As discussed above, automated construction robot process 34 may process 200 target area information 30 to locate e.g., walls, doors, windows, electrical outlets and light switches within work surface 18.

Accordingly, automated construction robot process 34 may process 350 target area information 30 to generate one or more edge instructions (e.g., edge instructions 70). When processing 350 target area information 30 to generate one or more edge instructions (e.g., edge instructions 70), automated construction robot system 10 may effectuate the following operations:

- Identifying 352 an object within target area information 30 to be avoided. For example, automated construction robot process 34 may process 350 target area information 30 to identify 352 objects (e.g., walls, doors, windows, electrical outlets and light switches) to be avoided within work surface 18.
- Processing 354 target area information 30 to generate one or more edge instructions (e.g., edge instructions 70) for applying coating material 48 to work surface 18 while avoiding the identified object (e.g., walls, doors, windows, electrical outlets and light switches) within work surface 18.

Automated construction robot process 34 may manipulate 356 the angle of incidence of head assembly 16 with respect to work surface 18 based, at least in part, upon the one or more edge instructions (e.g., edge instructions 70). As discussed above and referring again to FIG. 3, the angle of incidence ($\Theta$) is the angle between a ray incident on a surface (e.g., work surface 18) and the line perpendicular to the surface at the point of incidence. Accordingly and when spray fan 150 is positioned perpendicular to work surface 18 (as shown in solid lines), the angle of incidence ($\Theta$) is 90 degrees. This may result in a decrease in the crispness of edges 152, 154 of coating material 48 applied to work surface 18 (thus allowing for the dithering of edges 152, 154 and a blending of the stripes of coating material 48). However, rotating spray fan 150 about pivot point 156 included within wrist assembly 22 in a clockwise/counterclockwise direction may result in a decrease in the angle of incidence ($\Theta$) and an increase in the crispness of: the edge 152 (when rotating in a clockwise direction) and edge 154 (when rotating in a counterclockwise direction); thus allowing for coating material 48 to be "cut in" around e.g., ceilings, floors, walls, doors, windows, switches, outlets, baseboard moldings, crown moldings, etc.

Accordingly and when manipulating 356 the angle of incidence ($\Theta$) of head assembly 16 with respect to work surface 18 based, at least in part, upon the one or more edge instructions (e.g., edge instructions 70), automated construction robot process 34 effectuate one or more of the following operations:

- Rotating 358 head assembly 16 about an X-axis, which would enable automated construction robot process 34 to e.g., switch spray fan 150 between a horizontal orientation and a vertical orientation.
- Rotating 360 head assembly 16 about a Y-axis, which would enable automated construction robot process 34 to e.g., adjust the crispness of edges 152, 154 of coating material 48 applied to work surface 18 when spray fan 150 is vertically orientated.
- Rotating 362 head assembly 16 about a Z-axis, which would enable automated construction robot process 34 to e.g., adjust the crispness of edges 152, 154 of coating material 48 applied to work surface 18 when spray fan 150 is horizontally orientated.

Therefore and when manipulating 356 the angle of incidence (Θ) of head assembly 16 with respect to work surface 18 based, at least in part, upon the one or more edge instructions (e.g., edge instructions 70), automated construction robot process 34 may effectuate one or more of the following operations:

- decreasing 364 the angle of incidence (Θ) to increase the crispness of an edge (e.g., edges 152 and/or edge 154) of coating material 48 applied to work surface 18 (in the manner described above).
- increasing 366 the angle of incidence (Θ) to decrease the crispness of an edge (e.g., edges 152 and/or edge 154) of coating material 48 applied to work surface 18 (in the manner described above).

Concept 7 (Non-Target Area Scanning)

As discussed above, automated construction robot system 10 may include computational system 32 configured to execute automated construction robot process 34 and enable the interfacing with (and controlling of) one or more of mobile base assembly 12, head assembly 16, arm assembly 20, wrist assembly 22, rotation assembly 24 and machine vision system 26.

Further and as discussed above, automated construction robot system 10 may include machine vision system 26 configured to scan a target area (e.g., target area 28) and generate target area information 30. When scanning target area 28 to generate target area information 30, automated construction robot process 34 may manipulate and maneuver automated construction robot system 10 (generally) and mobile base assembly 12 (specifically) so that machine vision system 26 may scan the entirety of work surface 18 to generate target area information 30.

Additionally, machine vision system 26 may be configured to scan a non-target area (e.g., non-target area 72 and/or non-target area 74) and generate non-target area information 76. These non-target areas (e.g., non-target area 72 and/or non-target area 74) may be positioned proximate target area 28. For example, non-target area 72 may be positioned on the left of target area 28 and/or non-target area 74 may be positioned on the right of target area 28. Accordingly and assuming that coating material 48 is applied in a left-to-right fashion, non-target area 72 may be the area to which coating material 48 has already been applied and non-target area 74 may be the area to which coating material 48 has not yet been applied.

Figure 8:
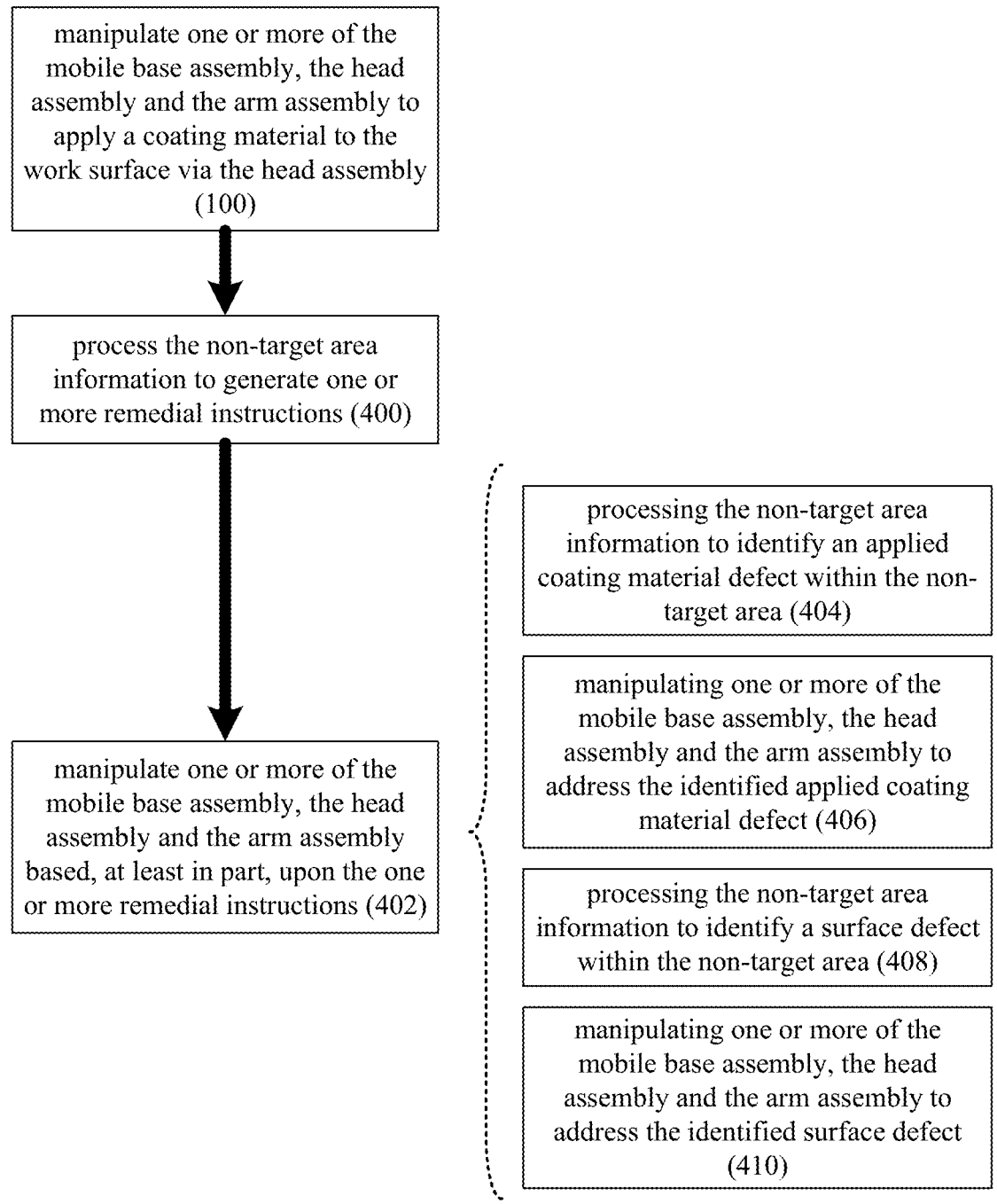
FIG. 8 is a another flowchart of an automated construction robot process executed by the automated construction robot system of FIGS. 1A-1E according to an embodiment of the present disclosure.

Referring also to FIG. 8 and as discussed above, automated construction robot process 34 may be configured to manipulate 100 one or more of mobile base assembly 12, head assembly 16 and arm assembly 20 to apply coating material 48 to work surface 18 via head assembly 16. Additionally, automated construction robot process 34 may be configured to process 400 the non-target area information (e.g., non-target area information 76) to generate one or more remedial instructions (e.g., remedial instructions 66).

Further and as discussed above, automated construction robot process 34 may manipulate 402 one or more of mobile base assembly 12, head assembly 16 and arm assembly 20 based, at least in part, upon the one or more remedial instructions (e.g., remedial instructions 66). Generally, remedial instructions 66 may instruct the various portions of automated construction robot system 10 (e.g., mobile base assembly 12, head assembly 16, arm assembly 20, wrist assembly 22, rotation assembly 24 and machine vision system 26) to perform various remedial actions (as will be discussed below in greater detail).

As discussed above, non-target area 72 may include an area (within work surface 18) to which coating material 48 has already been applied, wherein processing 400 non-target area information 76 to generate one or more remedial instructions (e.g., remedial instructions 66) includes processing 404 non-target area information 76 to identify an applied coating material defect (e.g., coating defect 80) within non-target area 72.

Examples of such applied coating material defects (e.g., coating defect 80) may include but are not limited to one or more of:

- No Coverage: An area to which coating material 48 was not applied at all (resulting in bare drywall),
- Light Coverage: An area to which coating material 48 was applied too thinly (resulting in partially bare drywall).
- Heavy Coverage: An area to which coating material 48 was applied too heavily (which may have resulted in a run or a sag).

When manipulating 402 one or more of mobile base assembly 12, head assembly 16 and arm assembly 20 based, at least in part, upon the one or more remedial instructions (e.g., remedial instructions 66), automated construction robot process 34 may manipulate 406 one or more of mobile base assembly 12, head assembly 16 and arm assembly 20 to address the identified applied coating material defect (e.g., coating defect 80).

Examples of the manner in which automated construction robot process 34 may manipulate 406 one or more of mobile base assembly 12, head assembly 16 and arm assembly 20 to address the identified applied coating material defect (e.g., coating defect 80) may include but are not limited to:

- Utilizing head assembly 16 to apply coating material 48 to the area to which coating material 48 was not applied at all.
- Utilizing head assembly 16 to apply coating material 48 to the area to which coating material 48 was applied too thinly.
- Utilizing head assembly 16 to sand the run/sag and to apply coating material 48 to the area that was sanded to address the run/sag.

As discussed above, non-target area 74 may include an area (within work area 18) to which coating material 48 has not yet been applied, wherein processing 400 non-target area information 76 to generate one or more remedial instructions (e.g., remedial instructions 66) may include processing 408 non-target area information 76 to identify a surface defect (e.g., surface defect 64) within non-target area 74.

As discussed above, examples of such surface defects (e.g., surface defect 64) may include but are not limited to one or more of:

A High Spot within the Work Surface 18: For example, a portion of drywall compound that was applied to work surface 18 may have been insufficiently sander, resulting in a high spot within work surface 18 that needs to be repaired.

A Low Spot within Work Surface 18: For example, an insufficient quantity of drywall compound may have been applied to work surface 18, resulting in a depression within work surface 18 that needs to be repaired.

A Crack within Work Surface 18: For example, a joint within the drywall, or an interior/exterior corner may be been insufficiently taped, resulting in a crack within work surface 18 that needs to be repaired.

A Hole within Work Surface 18: For example, damage to a piece of drywall may have occurred, resulting in a hole within work surface 18 that needs to be repaired.

A Protruding Screw within Work Surface 18: For example, a drywall screw may have been insufficiently set within work surface 18, resulting in a protruding screw head within work surface 18 that needs to be repaired.

A Protruding Nail within Work Surface 18: For example, a drywall nail may have been insufficiently set within work surface 18, resulting in a protruding nail head within work surface 18 that needs to be repaired.

When manipulating 402 one or more of mobile base assembly 12, head assembly 16 and arm assembly 20 based, at least in part, upon the one or more remedial instructions (e.g., remedial instructions 66), automated construction robot process 34 may manipulate 410 one or more of mobile base assembly 12, head assembly 16 and arm assembly 20 to address the identified surface defect (e.g., surface defect 64).

Examples of the manner in which automated construction robot process 34 may manipulate 410 one or more of mobile base assembly 12, head assembly 16 and arm assembly 20 to address the identified surface defect (e.g., surface defect 64) may include but are not limited to:

Utilizing head assembly 16 to sand the surface defect (e.g., surface defect 64) identified.

Utilizing head assembly 16 to apply joint compound to the surface defect (e.g., surface defect 64) identified.

Utilizing head assembly 16 to apply joint tape to the surface defect (e.g., surface defect 64) identified.

Utilizing head assembly 16 to set a protruding drywall screw within the surface defect (e.g., surface defect 64) identified.

Utilizing head assembly 16 to set a protruding nail within the surface defect (e.g., surface defect 64) identified.

Concept 5 (Variable Duty Cycle Microcontroller)

As discussed above, automated construction robot system 10 may include computational system 32 configured to execute automated construction robot process 34 and enable the interfacing with (and controlling of) one or more of mobile base assembly 12, head assembly 16, arm assembly 20, wrist assembly 22, rotation assembly 24 and machine vision system 26. Further and as discussed above, automated construction robot process 34 may be configured to manipulate 100 one or more of mobile base assembly 12, head assembly 16 and arm assembly 20 to apply coating material 48 to work surface 18 via head assembly 16.

Figure 9:
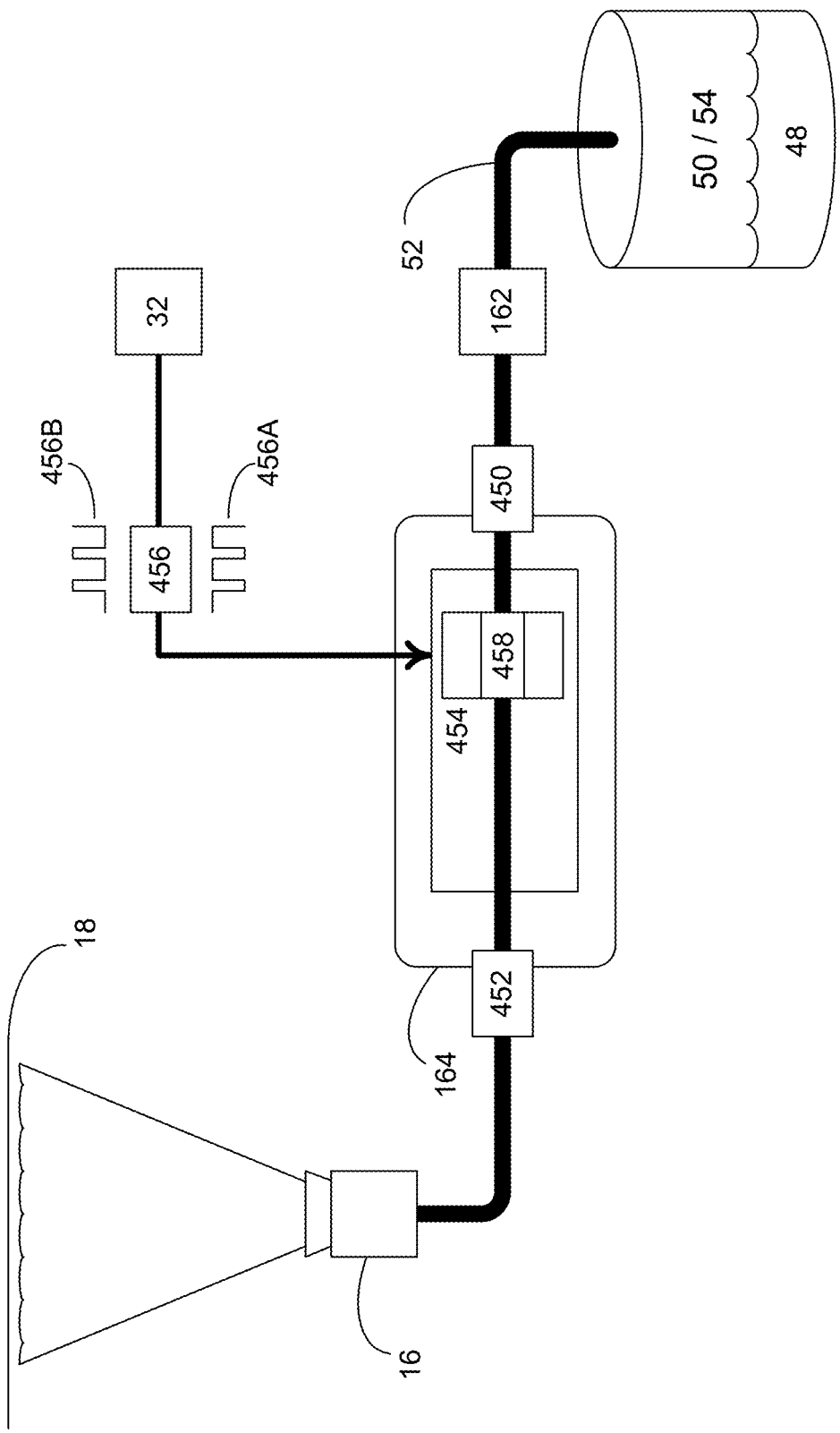
FIG. 9 is a diagrammatic detail view of a variable-duty-cycle microcontroller assembly of the automated construction robot system of FIGS. 1A-1E according to an embodiment of the present disclosure.

Referring also to FIG. 9 and as discussed above, supply line assembly 52 may be utilized to receive coating material 48 from a coating supply system (e.g., internal chamber 50 or external container 54). Pump assembly 162 may be utilized to pressurize coating material 48 (drawn from internal chamber 50/external container 54) and variable-duty-cycle microcontroller assembly 164 may be utilized to control 116 the volume of coating material 48 and/or control 118 the pressure of coating material 48 provided to head assembly 16.

Variable-duty-cycle microcontroller 164 may include:

inlet port 450 configured to receive coating material 48 from the coating supply system. Examples of such a coating supply system may include an internal chamber (e.g., internal chamber 50) within which coating material 48 may be stored and/or an external container (e.g., external container 54) that may contain coating material 48. This coating supply system may be a pressurized coating supply system (e.g., it may include pump assembly 162) in order to provide coating material 48 to inlet port 450 of variable-duty-cycle microcontroller 164.

outlet port 452 configured to provide a regulated quantity of coating material 48 to head assembly 16.

coating material regulation system 454 configured to control the passage of coating material 48 from inlet port 450 to outlet port 452, wherein coating material regulation system 454 may be configured to process a variable-duty-cycle control signal (e.g., control signal 456) provided by computational system 32 and regulate the quantity of coating material 48 applied to work surface 18 via head assembly 16. As will be discussed below in greater detail, the variable duty cycle control signal (e.g., control signal 456) may be configured to have an increased duty cycle (e.g., control signal 456A) when an increased quantity of coating material 48 is needed at outlet port 452. Conversely, the variable duty cycle control signal (e.g., control signal 456) may be configured to have a decreased duty cycle (e.g., control signal 456B) when a decreased quantity of coating material 48 is needed at outlet port 452.

Coating material regulation system 454 may include one or more valve assemblies (e.g., valve assemblies 458) configured to selectively fluidly-couple inlet port 450 and outlet port 452. The one or more valve assemblies (e.g., valve assemblies 458) may be configured to be selectively energized and deenergized based, at least in part, upon the variable-duty-cycle control signal (e.g., control signal 456). For example, automated construction robot process 34 may be configured to monitor the pressure of coating material 48 being applied to head assembly 16.

In the event that the pressure of coating material 48 being applied to head assembly 16 is too high, the variable-duty-cycle control signal (e.g., control signal 456) may be adjusted to regulate the pressure of the coating material 48 being applied to head assembly 16 downward. For example, the variable duty cycle control signal (e.g., control signal 456) may be adjusted to have a decreased duty cycle (e.g., control signal 456B) when a decreased quantity of coating material 48 is needed at outlet port 452.

Conversely, in the event that the pressure of the coating material 48 being applied to head assembly 16 is too low, the variable-duty-cycle control signal (e.g., control signal 456) may be adjusted to regulate the pressure of coating material 48 being applied to head assembly 16 upward. For example, the variable duty cycle control signal (e.g., control signal 456) may be adjusted to have an increased duty cycle (e.g., control signal 456A) when an increased quantity of coating material 48 is needed at outlet port 452.

Accordingly, selectively energizing and deenergizing the one or more valve assemblies (e.g., valve assemblies 458)

based, at least in part, upon the variable-duty-cycle control signal (e.g., control signal 456) may enable precise control of the quantity of coating material 48 provided to outlet port 452.

Multiple Robots

As discussed above, automated construction robot system 10 may include computational system 32 configured to execute automated construction robot process 34 and enable the interfacing with (and controlling of) one or more of mobile base assembly 12, head assembly 16, arm assembly 20, wrist assembly 22, rotation assembly 24 and machine vision system 26.

Further and as discussed above, automated construction robot system 10 may include machine vision system 26 configured to scan a target area (e.g., target area 28) and generate target area information 30. Additionally, machine vision system 26 may be configured to scan a non-target area (e.g., non-target area 72 and/or non-target area 74) and generate non-target area information 76.

While the scanning of target area 28 and non-target area 72, 74 is discussed above as being accomplished via a single automated construction robot system, this is for illustrative purposes only and is not intended to be a limitation of this disclosure, as other configurations are possible and are considered to be within the scope of this disclosure. For example, automated construction robot system 10 may include a plurality of automated construction robots, namely a primary construction robot (e.g., automated construction robot system 10); and a scout construction robot (e.g., scanning robot system 81). In such a configuration, the scout construction robot (e.g., scanning robot system 810) may be configured to effectuate the above-described scanning functionality (e.g., the scanning of target area 28 and/or non-target area 72, 74) to generate target area information 30 and/or non-target area information 76.

As discussed above, automated construction robot system 10 may be configured to be wirelessly coupled to access point 44 via wireless communication channel 46 established between automated construction robot system 10 and access point 44. Additionally, scout construction robot (e.g., scanning robot system 81) may be configured to be wirelessly coupled to access point 44 via a wireless communication channel established between scanning robot system 80 and access point 44. Accordingly, network 40 and access point 44 may be configured to allow automated construction robot system 10 and scanning robot system 81 to communicate, thus enabling the above-described scanning operations.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. An automated construction robot system comprising:
   a mobile base assembly configured to be displaceable within a work area;
   a head assembly configured to process a work surface;
   an arm assembly configured to moveably-couple the head assembly and the mobile base assembly and controllably-displace the head assembly with respect to the work surface;
   a machine vision system configured to scan a target area and generate target area information; and
   a computational system configured to:
     process the target area information to identify a surface defect, wherein the identified surface defect includes one or more of:
       a hole within the work surface;
       a protruding screw within the work surface; and
       a protruding nail within the work surface,
     generate one or more remedial instructions to correct the surface defect identified, and
     manipulate one or more of the mobile base assembly, the head assembly and the arm assembly based, at least in part, upon the one or more remedial instructions.

2. The automated construction robot system of claim 1 wherein manipulating one or more of the mobile base assembly, the head assembly and the arm assembly based, at least in part, upon the one or more remedial instructions includes one or more of:
   utilizing the head assembly to sand the surface defect identified;
   utilizing the head assembly to apply joint compound to the surface defect identified;
   utilizing the head assembly to apply joint tape to the surface defect identified;
   utilizing the head assembly to set a protruding drywall screw within the surface defect identified; and
   utilizing the head assembly to set a protruding nail within the surface defect identified.

3. The automated construction robot system of claim 1 wherein the surface defect identified includes one or more of:
   a high spot within the work surface;
   a low spot within the work surface; and
   a crack within the work surface.

4. The automated construction robot system of claim 1 wherein the computational system is further configured to:
   manipulate one or more of the mobile base assembly, the head assembly and the arm assembly to apply a coating material to the work surface via the head assembly.

5. The automated construction robot system of claim 4 wherein manipulating one or more of the mobile base assembly, the head assembly and the arm assembly to apply the coating material to the work surface via the head assembly includes one or more of:
   controlling the movement of the mobile base assembly within the work area;
   extending or retracting the arm assembly with respect to the mobile base assembly;
   controlling a location of the head assembly with respect to the work surface and/or the mobile base assembly;
   controlling a velocity of the head assembly with respect to the work surface and/or the mobile base assembly;
   rotating the head assembly with respect to the work surface; and
   controlling an angle of incidence of the head assembly with respect to the work surface.

6. The automated construction robot system of claim 4 wherein manipulating one or more of the mobile base assembly, the head assembly and the arm assembly to apply the coating material to the work surface via the head assembly includes one or more of:
controlling a spray fan width of the coating material applied to the work surface via the head assembly;
controlling a volume of the coating material provided to the head assembly; and
controlling a pressure of the coating material provided to the head assembly.

7. The automated construction robot system of claim 1 wherein the arm assembly includes:
a wrist assembly configured to enable a rotation of the head assembly with respect to the arm assembly.

8. The automated construction robot system of claim 1 wherein the arm assembly includes:
a rotation assembly configured to enable a rotation of the arm assembly with respect to the mobile base assembly.

9. The automated construction robot system of claim 1 wherein the automated construction robot system includes a plurality of automated construction robots.

10. The automated construction robot system of claim 9 wherein the plurality of automated construction robots includes:
a primary construction robot; and
a scout construction robot.

11. The automated construction robot system of claim 10 wherein the scout construction robot is configured to scan the target area and generate the target area information.

12. A computer-implemented method, executed on an automated construction robot system, comprising:
processing target area information to identify a surface defect, wherein the identified surface defect includes one or more of:
a hole within the work surface;
a protruding screw within the work surface; and
a protruding nail within the work surface;
generating one or more remedial instructions to correct the surface defect identified; and
manipulating one or more of a mobile base assembly, a head assembly and an arm assembly based, at least in part, upon the one or more remedial instructions;
wherein:
the mobile base assembly is configured to be displaceable within a work area,
the head assembly is configured to process a work surface, and
the arm assembly is configured to moveably-couple the head assembly and the mobile base assembly and controllably-displace the head assembly with respect to the work surface.

13. The computer-implemented method of claim 12 wherein manipulating one or more of the mobile base assembly, the head assembly and the arm assembly based, at least in part, upon the one or more remedial instructions includes one or more of:
utilizing the head assembly to sand the surface defect identified;
utilizing the head assembly to apply joint compound to the surface defect identified;
utilizing the head assembly to apply joint tape to the surface defect identified;
utilizing the head assembly to set a protruding drywall screw within the surface defect identified; and
utilizing the head assembly to set a protruding nail within the surface defect identified.

14. The computer-implemented method of claim 12 wherein the surface defect identified includes one or more of:
a high spot within the work surface;
a low spot within the work surface; and
a crack within the work surface.

15. The computer-implemented method of claim 12 wherein the arm assembly includes:
a wrist assembly configured to enable a rotation of the head assembly with respect to the arm assembly.

16. The computer-implemented method of claim 12 wherein the arm assembly includes:
a rotation assembly configured to enable a rotation of the arm assembly with respect to the mobile base assembly.

17. A computer program product residing on a non-transitory computer readable medium having a plurality of instructions stored thereon which, when executed by an automated construction robot system, cause the automated construction robot system to perform operations comprising:
processing target area information to identify a surface defect, wherein the identified surface defect includes one or more of:
a hole within the work surface;
a protruding screw within the work surface; and
a protruding nail within the work surface;
generating one or more remedial instructions to correct the surface defect identified; and
manipulating one or more of a mobile base assembly, a head assembly and an arm assembly based, at least in part, upon the one or more remedial instructions;
wherein:
the mobile base assembly is configured to be displaceable within a work area,
the head assembly is configured to process a work surface, and
the arm assembly is configured to moveably-couple the head assembly and the mobile base assembly and controllably-displace the head assembly with respect to the work surface.

18. The computer program product of claim 17 wherein manipulating one or more of the mobile base assembly, the head assembly and the arm assembly based, at least in part, upon the one or more remedial instructions includes one or more of:
utilizing the head assembly to sand the surface defect identified;
utilizing the head assembly to apply joint compound to the surface defect identified;
utilizing the head assembly to apply joint tape to the surface defect identified;
utilizing the head assembly to set a protruding drywall screw within the surface defect identified; and
utilizing the head assembly to set a protruding nail within the surface defect identified.

19. The computer program product of claim 17 wherein the surface defect identified includes one or more of:
a high spot within the work surface;
a low spot within the work surface; and
a crack within the work surface.

20. The computer program product of claim 17 wherein the arm assembly includes:
a wrist assembly configured to enable a rotation of the head assembly with respect to the arm assembly.

21. The computer program product of claim 17 wherein the arm assembly includes:
a rotation assembly configured to enable a rotation of the arm assembly with respect to the mobile base assembly.

* * * * *